(12) United States Patent
Shamai et al.

(10) Patent No.: US 12,088,701 B2
(45) Date of Patent: Sep. 10, 2024

(54) SECURE CONSENSUS OVER A LIMITED CONNECTION

(71) Applicant: Galaxy Digital Trading LLC, New York, NY (US)

(72) Inventors: Shahar Shamai, Rehovot (IL); Lior Lamesh, Rishon-LeZion (IL)

(73) Assignee: Galaxy Digital Trading LLC, New York, NY (US)

( * ) Notice: Subject to any disclaimer, the term of this patent is extended or adjusted under 35 U.S.C. 154(b) by 568 days.

(21) Appl. No.: 17/311,334

(22) PCT Filed: Dec. 5, 2019

(86) PCT No.: PCT/IL2019/051330
§ 371 (c)(1),
(2) Date: Jun. 6, 2021

(87) PCT Pub. No.: WO2020/115748
PCT Pub. Date: Jun. 11, 2020

(65) Prior Publication Data
US 2022/0021521 A1 Jan. 20, 2022

Related U.S. Application Data

(60) Provisional application No. 62/775,942, filed on Dec. 6, 2018.

(51) Int. Cl.
*H04L 29/00* (2006.01)
*G06Q 20/36* (2012.01)
(Continued)

(52) U.S. Cl.
CPC ......... *H04L 9/085* (2013.01); *G06Q 20/3676* (2013.01); *G06Q 20/3825* (2013.01);
(Continued)

(58) Field of Classification Search
CPC ..... H04L 9/085; H04L 9/0869; H04L 9/3255; H04L 9/50; G06Q 20/3676; G06Q 20/3825
(Continued)

(56) References Cited

U.S. PATENT DOCUMENTS 9,225,695 B1 12/2015 Riera et al.
9,537,833 B2 1/2017 Zatko et al.
(Continued)

FOREIGN PATENT DOCUMENTS

CN 106296359 1/2017
EP 331775 1/2017
(Continued)

OTHER PUBLICATIONS

Supplementary European Search Report and the European Search Opinion Dated Sep. 13, 2022 From the European Patent Office Re. Application No. 19891713.0. (9 Pages).
(Continued)

*Primary Examiner* — Jeffrey C Pwu
*Assistant Examiner* — Michael D Anderson

(57) ABSTRACT

A method of validating a multi-party consensus over a limited connection comprising a validating device configured to transmit a query having a finite number of possible valid answers to a plurality of computing nodes via a unidirectional secure communication channel, receive a limited length string computed based on an aggregated response aggregating a plurality of responses each computed for a multi-party consensus answer to the query by each of at least some of the plurality of computing nodes using a respective secret component, compute a plurality of locally computed strings each computed based on a respective one of the finite number of possible valid answers using an aggregated secret aggregating the plurality of secret com-
(Continued)

ponents, validate the multi-party consensus answer by comparing the received limited length string to each of the plurality of locally computed strings and initiating one or more operations according to an outcome of the validation.

20 Claims, 3 Drawing Sheets

(51) Int. Cl.
  *G06Q 20/38* (2012.01)
  *H04L 9/08* (2006.01)
  *H04L 9/32* (2006.01)
  *H04L 9/00* (2022.01)
(52) U.S. Cl.
  CPC .......... *H04L 9/0869* (2013.01); *H04L 9/3255* (2013.01); *G06Q 2220/00* (2013.01); *H04L 9/50* (2022.05); *H04L 2209/463* (2013.01); *H04L 2209/56* (2013.01)
(58) Field of Classification Search
  USPC .......................................................... 713/171
  See application file for complete search history.

(56) References Cited

U.S. PATENT DOCUMENTS

| | | |
|---|---|---|
| 2006/0041934 A1 | 2/2006 | Hetzler |
| 2006/0242423 A1 | 10/2006 | Kussmaul |
| 2009/0204593 A1* | 8/2009 | Bigby .................... G06F 16/27 |
| 2015/0262171 A1 | 9/2015 | Langschacdel et al. |
| 2015/0295720 A1 | 10/2015 | Buldas et al. |
| 2015/0324789 A1 | 11/2015 | Dvorak et al. |
| 2016/0342977 A1 | 11/2016 | Lam |
| 2017/0085555 A1 | 3/2017 | Bisikalo et al. |
| 2017/0109735 A1* | 4/2017 | Sheng ................ G06Q 20/3678 |
| 2017/0232300 A1 | 8/2017 | Tran et al. |
| 2019/0052454 A1 | 2/2019 | Wright et al. |
| 2019/0318356 A1 | 10/2019 | Martin et al. |
| 2019/0356484 A1 | 11/2019 | Ettensohn et al. |
| 2020/0134606 A1 | 4/2020 | Todd et al. |
| 2021/0049591 A1 | 2/2021 | Lamesh |

FOREIGN PATENT DOCUMENTS

| | | |
|---|---|---|
| EP | 3259724 | 12/2017 |
| WO | WO 2018/020389 | 2/2018 |
| WO | WO 2019/159172 | 8/2019 |
| WO | WO 2020/115748 | 6/2020 |
| WO | WO 2020/225814 | 11/2020 |

OTHER PUBLICATIONS

Li et al. "Privacy-Preserving Participatory Sensing", IEEE Communications Magazine, XP011664922, 53(8): 68-74, Aug. 1, 2015.
Owiyo et al. "Decentralized Privacy Preserving Reputation System", 2018 IEEE Third International Conference on Data Science in Cyperspace, DSC, XP033375426, Guangzhou, China, Jun. 18-21, 2018, p. 665-672, Jun. 18, 2018.
Supplementary European Search Report and the European Search Opinion Dated Oct. 6, 2021 From the European Patent Office R. Application No. 19754487.7. (9 Pages).
Armory Technologies "Armory FAQ", Armory Technologies, XP055845074, p. 1-7, 2016.
Armory Technologies "Best Bitcoin Wallet Armory | Multi-Signature Cold Storage", Armory Technologies, XP055845060, p. 1-3, Feb. 3, 2016.
Bitcoin Stack Exchange How to Sign A Transaction Using Only An Offline Computer?, Bitcoin Stack Exchange, XP055845053, p. 1-3, Feb. 8, 2014.
Coinkite "Announcing: Coldcard™. The World Needs An Open, Cheap & Ultrasecure Hardware Wallet!", Coinkite Blog, XP055845066, p. 1-5, Dec. 2017.
Voegtlin "Multising Wallets", Electrum Read the Docs, XP055771867, p. 1-5, Mar. 29, 2017.
International Preliminary Report on Patentability Dated Jun. 17, 2021 From the International Bureau of WIPO Re. Application No. PCT/IL2019/051330. (9 Pages).
International Preliminary Report on Patentability Dated Aug. 27, 2020 From the International Bureau of WIPO Re. Application No. PCT/IL2019/050181. (8 Pages).
International Search Report and the Written Opinion Dated Jun. 3, 2020 From the International Searching Authority Re. Application No. PCT/IL2020/050496. (29 Pages).
International Search Report and the Written Opinion Dated Jun. 19, 2019 From the International Searching Authority Re. Application No. PCT/IL2019/050181. (13 Pages).
International Search Report and the Written Opinion Dated Mar. 24, 2020 From the International Searching Authority Re. Application No. PCT/IL2019/051330. (14 Pages).
International Search Report and the Written Opinion Dated May 27, 2021 From the International Searching Authority Re. Application No. PCT/IL2021/050237. (12 Pages).
Invitation to Pay Additional Fees and Communication Relating to the Results of the Partial International Search Dated May 19, 2019 From the International Searching Authority Re. Application No. PCT/IL2019/050181. (4 Pages).
Nakamoto "Bitcoin: A Peer-to-Peer Electronic Cash System", Bitcoin White Paper, Retrieved From the Internet, Oct. 31, 2008.
Search Report and Written Opinion Dated Oct. 10, 2022 From the Intellectual Property Office of Singapore, IPOS Re. Application No. 11202105973Q. (12 Pages).

* cited by examiner

US 12,088,701 B2

SECURE CONSENSUS OVER A LIMITED CONNECTION

RELATED APPLICATIONS

This application is a National Phase of PCT Patent Application No. PCT/IL2019/051330 having International filing date of Dec. 5, 2019, which claims the benefit of priority under 35 USC § 119(e) of U.S. Provisional Patent Application No. 62/775,942 filed on Dec. 6, 2018. The contents of the above applications are all incorporated by reference as if fully set forth herein in their entirety.

FIELD AND BACKGROUND OF THE INVENTION

The present invention, in some embodiments thereof, relates to validating a multi-party consensus, and, more specifically, but not exclusively, to validating a multi-party consensus by a validating device having limited connection.

Distributed processing in which a community of computing nodes and processing devices participate in a common task or computation is constantly spreading as its strengths and advantages are acknowledged and put to use in a plurality of applications ranging from Multi-Party Computation (MPC) for load distribution through majority voting applications to blockchain networks.

Having no trusted central control, trust becomes a major concern for the community members engaged in the distributed processing since the computing nodes are unfamiliar with each other and may therefore be unable to trust each other in attempt to reach a consensus. This may be fertile ground for malicious parties which may attempt to manipulate the outcome of the common task executed by the plurality of community members to their own benefit.

In order to overcome the trust hurdle and enable the community of untrusted members to reach consensus, a plurality of distributed processing protocols have been introduced, among which the blockchain technology may be the most prominent and most rapidly spreading one. The blockchain networks are deployed to facilitate distributed ledgers for a plurality of uses, for example, cryptocurrency, smart contracts, activity tracking and/or the like. The distributed ledgers stored simultaneously by a plurality untrusted community members may be constantly and transparently updated to record transactions made in the blockchain network.

The blockchain protocol was developed to fulfill several criteria essential for the community of distributed untrusted members to maintain the distributed ledgers in a secure and undisputed manner. Some of these major features characterizing the blockchain protocol include decentralization of consensus as there is no central trusted entity, transparency to ensure all records are auditable to the community members, security of the records to make them irreversible and thus immune to tampering and immutability to verify non-reproduction and irreversibility of the records.

SUMMARY OF THE INVENTION

According to a first aspect of the present invention there is provided a method of validating a multi-party consensus over a limited connection, comprising using one or more processors of a validating device for:

Transmitting a query to a plurality of computing nodes via a unidirectional secure communication channel. The query having a finite number of possible valid answers.

Receiving a limited length string computed based on an aggregated response aggregating a plurality of responses each computed for a multi-party consensus answer to the query by each of at least some of the plurality of computing nodes using a respective one of a plurality of secret components.

Computing a plurality of locally computed strings each computed based on a respective one of the finite number of possible valid answers using an aggregated secret aggregating the plurality of secret components.

Validating the multi-party consensus answer by comparing the received limited length string to each of the plurality of locally computed strings.

Initiating one or more operations according to an outcome of the validation.

According to a second aspect of the present invention there is provided an apparatus for validating a multi-party consensus over a limited connection, comprising:

A first interface, adapted to transmit messages to a plurality of computing nodes over a unidirectional secure communication channel.

A second interface adapted to receive limited length strings.

One or more processors coupled to the first and second interfaces, the one or more processor is adapted to execute a code, the code comprising:

Code instructions to transmit a query to the plurality of computing nodes. The query having a finite number of possible valid answers.

Code instructions to receive a limited length string computed based on an aggregated response aggregating a plurality of responses each computed for a multi-party consensus answer to the query by each of at least some of the plurality of computing nodes using a respective one of a plurality of secret components.

Code instructions to compute a plurality of locally computed strings each computed based on a respective one of the finite number of possible valid answers using an aggregated secret aggregating the plurality of secret components.

Code instructions to validate the multi-party consensus answer by comparing the received limited length string to each of the plurality of locally computed strings.

Code instructions to initiate one or more operations according to an outcome of the validation.

In a further implementation form of the first and/or second aspects, the one or more operations comprising outputting the outcome of the validation.

In a further implementation form of the first and/or second aspects, the validating device applies the validation of the multi-party consensus answer for checking blockchain transactions information relating to the validating device.

In a further implementation form of the first and/or second aspects, the validating device is a crypto-currency wallet and the validation of the multi-party consensus response is applied for checking a balance of the crypto-currency wallet.

In a further implementation form of the first and/or second aspects, the one or more operations comprising transmitting one or more cryptocurrency transactions based on the multi-party consensus answer after validated.

In a further implementation form of the first and/or second aspects, the unidirectional secure communication channel is physically tamper resistant thus supporting reliable and secure one-way communication from the validating device to each of the plurality of computing nodes.

In a further implementation form of the first and/or second aspects, the validating device communicates with the plurality of computing nodes via one or more access nodes of the plurality of computing nodes which broadcasts messages received from the validating device to the plurality of computing nodes.

In a further implementation form of the first and/or second aspects, the secure unidirectional communication channel established with one or more of the plurality of computing nodes is secured by encrypting communication transmitted from the validating device to the computing node(s) using an encryption key of a respective encryption-decryption key pair uniquely associated with each of the computing node(s). The respective encryption key is provided to the validating device as a respective limited length string.

In an optional implementation form of the first and/or second aspects, the secure unidirectional communication channel established with one or more of the plurality of computing nodes is secured by encrypting communication transmitted from the validating device to the one or more computing nodes using an encryption key of a respective encryption-decryption key pair uniquely associated with each of the computing node(s). The encryption key is provided to the validating device by one or more of the trusted controller adapted to distribute to one or more of the computing nodes a decryption key of the respective encryption-decryption key pair uniquely associated with each of the one or more computing nodes. The encryption-decryption key pair is produced deterministically using a pseudo-random number generator initialized with a random seed shared in advance with the validating device. Using the shared random seed, the validating device generates the encryption key of the respective encryption-decryption key pair and uses it to establish the encrypt communication transmitted to a respective one of the one or more computing nodes.

In a further implementation form of the first and/or second aspects, one or more of the trusted controllers are further adapted to periodically distribute a new encryption-decryption key pair to one or more of the computing nodes every predefined period of time. The new encryption-decryption key is produced deterministically using the pseudorandom number generator initialized with the random seed shared with the validating device and a time identifier assigned to the new encryption-decryption key.

In a further implementation form of the first and/or second aspects, one or more of the trusted controllers are further adapted to distribute a respective encryption-decryption key pair to each of multiple computing nodes. Each encryption-decryption key pair is produced deterministically using the pseudorandom number generator initialized with the random seed shared with the validating device and an index of the respective computing node.

In a further implementation form of the first and/or second aspects, one or more of the trusted controllers are communicate with one or more of the computing nodes via a unidirectional secure communication channel similar to the unidirectional secure communication channel of the validating device.

In an optional implementation form of the first and/or second aspects, the validating device signs the query transmitted to the plurality of computing nodes using a signing key.

In an optional implementation form of the first and/or second aspects, the transmitted query is coupled with a unique identifier which is used by the at least some computing nodes to compute the plurality of responses is used by the validating device to verify that the limited length string corresponds to the query.

In an optional implementation form of the first and/or second aspects, the unique identifier is a time stamp of the transmission of the query.

In an optional implementation form of the first and/or second aspects, one or more of the plurality of computing nodes communicates with at least another one of the plurality of computing nodes to support computation of a respective one of the plurality of responses.

In a further implementation form of the first and/or second aspects, the plurality of secret components are transmitted by the validating device to the plurality of computing nodes.

In an optional implementation form of the first and/or second aspects, the validating device transmits the plurality of secret components to the plurality of computing nodes once during an initialization sequence.

In an optional implementation form of the first and/or second aspects, the validating device signs the plurality of secret components transmitted to the plurality of computing nodes using a signing key.

In a further implementation form of the first and/or second aspects, the validating device transmits the respective secret component to each of the computing nodes with the query.

In a further implementation form of the first and/or second aspects, the limited length string is provided to the validating device using one or more access computing nodes of the plurality which computes the limited length string based on the aggregated response.

In a further implementation form of the first and/or second aspects, the limited length string is received via a secure Human Machine Interface (HMI) operated by a user to input the limited length string.

In an optional implementation form of the first and/or second aspects, a length of the limited length string requested for computing the aggregated response received in response to one or more subsequent queries is increased in case the received multi-party consensus answer is invalid.

In an optional implementation form of the first and/or second aspects, a two-stage query is applied for a complex query having an extremely large number of possible valid answers as follows:

In a first stage of the two-stage query, the validating device transmits the complex query to the plurality of computing nodes and receives in response a first limited length string computed based on a first multi-party answer computed by one or more of the at least some computing nodes for the multi-party consensus answer to the complex query using the respective secret component. Wherein the validating device uses the aggregated secret to extract the first multi-party answer.

In a second stage of the two-stage query, the validating device transmits a second query requesting the at least some computing nodes to confirm the first multi-party answer received for the complex query. The second query having two possible valid answers, namely correct and incorrect.

In a further implementation form of the first and/or second aspects, the plurality of secret components is a plurality of symmetric hash functions, each of the plurality of computing nodes uses a respective one of the plurality of symmetric hash functions to compute a respective one of a plurality of hash values based on the multi-party consensus answer to the query. The limited length string is an aggregated hash value computed by aggregating the plurality of hash values computed by the plurality of computing nodes. The validation is done by comparing the limited length string to each of a set of locally generated limited length strings each generated for a respective one of the finite number of possible valid answers using aggregation of the plurality of symmetric hash functions.

In an optional implementation form of the first and/or second aspects, a plurality of hash values locally computed by the validating device for each of the finite number of possible valid answers are published in case, based on analysis of the received limited length string, the validating device determines that the multi-party consensus answer is invalid. Each of the plurality of locally computed hash values is computed using a respective one of the plurality of symmetric hash functions. One or more of the plurality of computing nodes identifies one or more malicious computing nodes of the plurality of computing nodes by detecting incompliance between one or more hash values computed by one or more malicious computing nodes and a respective one of the plurality of locally computed hash values.

In an optional implementation form of the first and/or second aspects, a plurality of deterministic signing functions are used instead of the plurality of symmetric hash functions. Each of the plurality of deterministic signing functions has a respective one of a plurality of signing-verifying key pairs. Each of the plurality of computing nodes applies a respective one of the plurality of deterministic signing functions to sign a respective one of the plurality of responses using a signing key of the respective signing-verifying key pair.

In an optional implementation form of the first and/or second aspects, one or more computing nodes having the verifying key of at least some of the plurality of signing-verifying key pairs determines, prior to computing the aggregated hash value, that one or more malicious computing nodes are present among the plurality of computing nodes in case of detection that one or more of the plurality of responses is incompliant with a majority of the plurality of responses. One or more of the malicious computing nodes are identified according to the verifying key corresponding to the signing key used to sign a respective one of the one or more incompliant responses.

In a further implementation form of the first and/or second aspects, the plurality of secret components are a plurality of partial secret components created from a secret value generated for each of the finite number of possible valid answers using one or more secret sharing algorithms. The validating device generates a respective one of a plurality of random strings each generated for the respective possible valid answer and splits each of the plurality of random strings to a respective set of partial strings using one or more of the secret sharing algorithms applied according to one or more configuration parameters. The query transmitted to each of the plurality of computing nodes comprises a respective partial string of each set of partial values. Each of the at least some computing nodes transmits its respective partial string corresponding to the multi-party consensus answer. The limited length string is a hash value computed based on the aggregated response aggregating the partial strings received from a sufficient number of the plurality of computing nodes. The sufficient number is defined by the one or more configuration parameters. The validation is done by comparing the limited length string to each of a set of locally generated limited length strings each generated for a respective one of the finite number of possible valid answers using the secret value.

In an optional implementation form of the first and/or second aspects, a plurality of commitment values are published to support detection of one or more malicious computing nodes of the sufficient number of computing nodes prior to providing the limited length string to the validating device. Each of the plurality of commitment values is computed for a respective partial string of each set of partial strings using one or more commitment functions. In addition to its respective partial string each of the plurality of sufficient number of computing nodes publishes a respective proof of commitment computed for its respective partial string using one or more of the commitment functions. One or more of the plurality of computing nodes use a respective one of the plurality of commitment values published by the validating device in conjunction with the proof of commitment received from each of the sufficient number of computing nodes to verify each received partial string is compliant with the respective response received from the respective computing node of the sufficient number of computing nodes. In case one or more of the received partial strings is incompliant, one or more of the computing nodes identify the one or more malicious computing nodes which transmitted a respective one of the one or more incompliant partial strings.

In an optional implementation form of the first and/or second aspects, one or more of the malicious computing nodes are discarded from the sufficient number of computing nodes and replaced with another computing node currently not part of the sufficient number of computing nodes.

In an optional implementation form of the first and/or second aspects, the query is split to a plurality of queries each corresponding to a respective one of a plurality of portions which aggregated together map each of the finite number of possible valid answers. For each of the plurality of portions, a respective set of partial secret components is created from a secret value generated for each possible valid answers to the respective portion using at least one secret sharing algorithm. The validating device generates a respective one of a plurality of random strings each possible valid answer of each portion and splits each of the plurality of random strings to a respective set of partial strings using the at least one secret sharing algorithm applied according to at least one configuration parameter. Each of the sub-queries transmitted to each of the plurality of computing nodes comprises a respective partial string of each set of partial values generated for the respective sub-query, each of the at least some computing nodes transmits its respective partial string corresponding to the multi-party consensus answer for the respective portion. The limited length string is a hash value computed based on one or more combinations and/or encoded representations, for example, a concatenation of the aggregated responses for each of the sub-queries aggregating the partial strings received from a sufficient number of the plurality of computing nodes.

In a further implementation form of the first and/or second aspects, the plurality of secret components are a plurality of decryption key components created by splitting a decryption key of an encryption-decryption key pair using one or more threshold decryption algorithms applied according to one or more configuration parameters. The query transmitted to the plurality of computing nodes comprises the query and a plurality of encrypt values encrypting a plurality of random strings each generated by the validation device for a respective one of the finite number of possible valid answers. The plurality of encrypt values are produced by encrypting the plurality of random strings using an encryption key of the encryption-decryption key pair. A sufficient number of the plurality of computing nodes engage in a Multi-Party Computation (MPC) and use their respective decryption key components to decrypt an encrypt value of the plurality of encrypt values corresponding to a certain one of the finite number of possible valid answers as expressed in the multi-party consensus answer. The limited length string is a hash value computed for the decrypted encrypt value. The sufficient number is defined by the one or more configuration parameters. The validation is done by comparing the limited length string to each of a set of locally generated limited length strings each generated for a respective one of the random strings generated for the finite number of possible valid answers.

In an optional implementation form of the first and/or second aspects, the encryption key and the plurality of decryption key components are published to identify one or more malicious computing nodes of the sufficient number of computing nodes in case the one or more malicious computing nodes engaged in MPC in an improper manner. One or more of the malicious computing nodes is identified according to its respective decryption key component.

In a further implementation form of the first and/or second aspects, the plurality of secret components are a plurality of signing key components created from a signing key of a signing-verifying key pair split using one or more threshold signature algorithms applied according to one or more configuration parameters. Each of the one or more threshold signature algorithms is characterized by producing a deterministic output for a given input. The query transmitted to the plurality of computing nodes comprises the query and a plurality of strings each corresponding to a respective one of the finite number of possible valid answers. A sufficient number of computing nodes of the plurality of computing nodes engage in a Multi-Party Computation (MPC) and use their respective signing key components to produce a deterministic signature for one of the plurality of strings corresponding to an agreed one of the finite number of possible valid answers as expressed in the multi-party consensus answer. The limited length string is a hash value computed for the deterministic signature. The sufficient number is defined by the one or more configuration parameters. The validation is done by comparing the limited length string to each of a set of locally computed limited length strings each computed for respective deterministic signature generated for a respective one of the plurality of strings using the signing key.

In an optional implementation form of the first and/or second aspects, one or more of the sufficient number of computing nodes identifies one or more malicious computing nodes of the sufficient number of computing nodes in case the one or more malicious computing nodes engaged in MPC in an improper manner. Identification of one or more of the malicious computing nodes is inherent to each of the one or more threshold signature algorithms.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
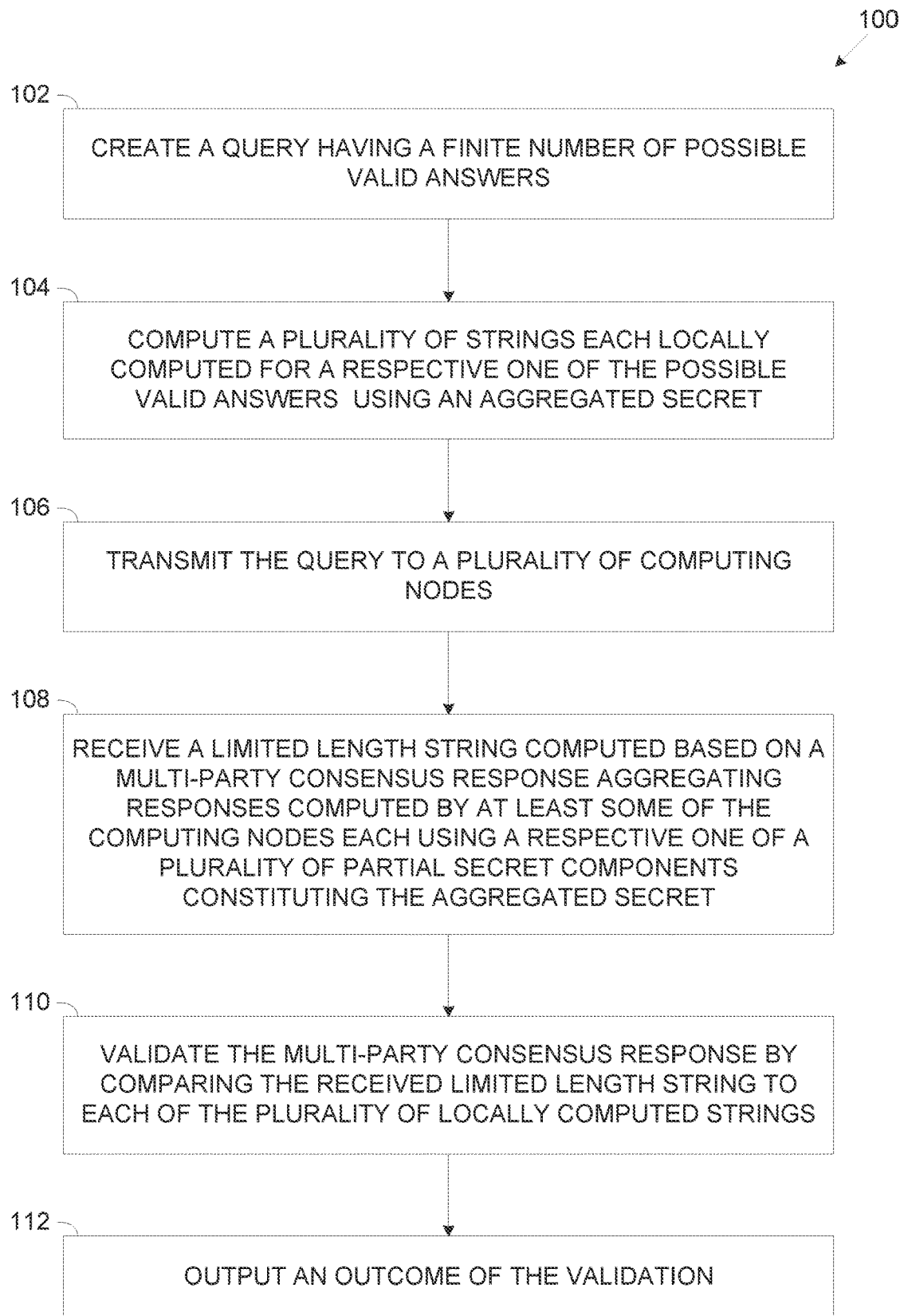
FIG. 1 is a flowchart of an exemplary process of validating a multi-party consensus by a validating device having limited connection, according to some embodiments of the present invention.

The present invention, in some embodiments thereof, relates to validating a multi-party consensus, and, more specifically, but not exclusively, to validating a multi-party consensus by a validating device having limited connection.

According to some embodiments of the present invention, there are provided methods, systems and computer program products for validating multi-party consensus answers to queries issued by a validating device having a limited connection to a network, in particular a device which is used for interacting with a community of computing nodes, some of which may be untrusted and potentially malicious, deployed for distributed processing in which the computing nodes participate in a common task or computation. Specifically, the community of computing nodes may form a community network deployed to track and log information and negotiate to agree and decide on multi-party consensus answers to queries submitted to the community network. In that regard, the validating device may be, for example, a private device used to store private information of an associated user where a blockchain is used to log and track transactions and/or data relating to a plurality of users. Specifically, the blockchain may be a cryptocurrency blockchain where the validating device may be cold wallet used to store a cryptocurrency account of the associated user.

The validation of the answers to the queries at the validating device is primarily based on using one or more partial secret schemes in which only the validating device has access to a complete secret while each of the computing nodes has only a partial secret component of the secret. After deciding on multi-party consensus answer, each of at least some of the computing nodes in the community network computes its response using its respective partial secret. A plurality of responses each computed by one of at least some of the computing nodes are aggregated to form an aggregated encrypted response which is provided to the validating device. As none of the computing nodes has the partial secret components of other computing nodes no computing node may decipher the responses and possibly compromise them in attempt to manipulate the aggregated encrypted response in order to manipulate the multi-party consensus answer. The validating device, having the complete secret, may validate whether the received aggregated computed response reflects multi-party consensus answer which matches one of a finite number of possible valid answers to the query.

The community network may typically include untrusted computing nodes such that while a majority of the computing nodes are assumed to be honest computing nodes which follow the rules of the community, for example, the blockchain, one or more malicious computing nodes may also be present in the community network. Such malicious computing nodes may attempt to manipulate actions and/or data in the blockchain. In order to maintain the criteria essential for the distributed processing, specifically for the blockchain, the plurality of computing nodes may engage to decide on agreed multi-party consensus decisions relating to the actions and/or data in the blockchain.

Naturally, the validating device must communicate with the community network over the network in order to, for example, use the cryptocurrency stored in the device and transfer the transaction request using one or more of those nodes. However, it may be essential to isolate the validating device from network in order to make the validating device immune to network based attacks initiated by malicious parties to compromise the validating device in attempt to gain access to private data stored in the validating device and/or to operate the validating device in an undesirable manner to their own benefit.

To this end the validating device may establish a secure unidirectional channel for transmitting data to at least some of the computing nodes of the community network while supporting only a very limited (data) capacity input interface disconnected and hence isolated from the network. The limited capacity input interface may be operated manually and/or automatically. For example, the limited capacity input interface may include a user input interface which may receive limited length strings of characters inserted by an associated user. In another example the limited data input interface may include a computer punched card reader configured to read data encoded in punched cards inserted manually and/or automatically to the computer punched card reader. As such the validating device is practically isolated from the network and is therefore highly immune to the network based attacks.

The secure unidirectional channel may be implemented through one or more optical, wired and/or wireless output interfaces adapted for data transmission only and unable to receive data. Through the output interface(s) the validating device may transmit data to one or more access devices, for example, a smartphone, a tablet, a computer, a server, a processing node and/or the like connected to the network and hence capable of transferring the data to the community network of computing nodes. Furthermore, the validating device may uniquely encrypt the data directed for each of at least some of the computing nodes using one or more encryption schemes to establish a secure channel with the respective computing node. In case of the cryptocurrency blockchain where the validating device is the cold wallet, the access device may be regarded as a hot wallet. The access device may optionally be an access computing node which is part of the community network, specifically part of the blockchain network.

The validating device may need to interact with the community network of computing nodes in order to receive information, specifically information relating to the validating device and/or to the associated user. However, since the validating device is isolated from the network it is unable to directly receive data from the computing nodes. To overcome this, the validating device may include one or more limited capacity input interfaces which may be manually and/or automatically manipulated. For example, the associated user performing as an intermediator between the access device and the validating device may obtain the limited length strings received from the community network and operate the user interface (e.g. keyboard, touchscreen, etc.) to insert the limited length strings to the validating device. In another example, the limited length strings may be inserted automatically using an automated mechanism, for example, a robotic mechanism which may automatically collect one or more computer punch cards encoding the limited length strings and insert the computer punch card(s) to the computer punch cards reader of the validating device.

The validating device may issue (transmit) one or more queries to the computing nodes, for example, queries relating to cryptocurrency account stored in the validating device (cold wallet), for example, cryptocurrency balance at the cold wallet, a number of cryptocurrency transactions made from/to the cold wallet, verify a value of a cryptocurrency transaction made to a certain destination, check the identity (destination address) of another wallet to which a cryptocurrency transaction was made and/or the like.

In response to each query at least a majority of the computing nodes may decide on a multi-party consensus answer. Since the community network may include one or more malicious nodes, the validating device may need to validate the response received from the community network. The validating device may therefore issue queries which have a finite number of possible valid answers and may validate that the received multi-party consensus answer matches one of the possible valid answers.

To further verify the integrity of the received multi-party consensus answer, the response provided to the validating device is an aggregated response aggregating a plurality of responses computed by at least some of the computing nodes based on the multi-party consensus answer and a respective one of a plurality of partial secret components uniquely available to each of the computing nodes. Having only a partial secret component, none of the computing nodes in the community network may individually recover the aggregated encrypted response. Moreover, based on the partial secret scheme and/or its configuration, even several malicious (or compromised) computing nodes colluding together may be unable to recover the aggregated response. As the partial secret component are not available to them, the malicious computing node(s) may therefore be unable to manipulate the multi-party consensus answer and compute an alternate fraudulent aggregated response.

The validating device is the only one having the aggregated secret aggregating the plurality of partial secret components and may therefore be able to recover the aggregated response and validate it against the finite number of possible valid answers to the query.

Since the limited capacity interface of the validating device may allow for inserting only limited length strings comprising a limited number of characters, the aggregated response may be further processed, for example, applied with a hash function to produce a (fixed length) limited length string which may be provided to the validating device. The validating device may also apply the same processing, for example, apply the same hash function to compute a locally compute a respective string for each of the possible valid answers.

The validating device may then validate that the multi-party consensus answer corresponds to one of the possible valid answers by comparing (matching) between the received limited length string and each of the locally computed strings. In case of a match the validating device may determine the multi-party consensus answer is valid, i.e. the multi-party consensus answer is one of the possible valid answers. However, in case of no match the validating device may determine the multi-party consensus answer is invalid, i.e. the multi-party consensus answer is not one of the possible valid answers.

After completing the validation process, the validating device may initiate one or more operations based on the outcome of the validation. For example, the validating device may output the outcome of the validation, i.e. whether the received multi-party consensus answer is valid or not, for example, present the outcome to the associated user and/or the like. In another example, the validating device, for example, the cold wallet may initiate one or more cryptocurrency transactions. Specifically, the query issued by the validating device is directed to determine the balance of cryptocurrency at the cold wallet. Based on the received validated multi-party consensus answer the cold wallet may determine whether there are sufficient cryptocurrency funds for one or more cryptocurrency transactions and may initiate transmission of the cryptocurrency transaction(s) accordingly.

An invalid multi-party consensus answer may result from a failure to input the limited length string to the validating device, for example, the user mistyping the limited length string received from the community network. However, the invalid answer may result from the presence of one or more malicious computing nodes attempting to fraudulently manipulate the multi-party consensus answer. In such case, the validating device may indicate the associated user of the presence of a potential malicious computing node(s) in the community network.

A plurality of secret and partial secret schemes may be applied to facilitate the aggregated encrypted response, for example, symmetric encryption functions uniquely associated with each of the computing nodes, secret sharing algorithms, threshold decryption algorithms, threshold signature algorithms and/or the like as described herein after in detail.

Some of the partial secret schemes may further allow detection of the identity of one or more of the malicious computing node(s). In some of the partial secret schemes the presence and optionally the identity of the malicious computing node(s) may be identified based on information published by the validating device. In some schemes the validating device may publish such information, specifically partial secret information after validating the multi-party consensus answer, specifically in case the multi-party consensus answer is determined invalid. Moreover, in some of the schemes the malicious computing node(s) may be identified based on information published by the validating device prior to receiving the limited length string from the community network, i.e. before the associated user manually interacts with the validating device. Furthermore, some of the partial secret schemes may inherently support detection of presence and optionally identity of the malicious computing nodes during a Multi-Party Computation (MPC) in which a plurality of computing nodes may engage to generate the aggregated encrypted response.

Moreover, some of the partial secret schemes, for example, Shamir secret sharing algorithms, threshold decryption algorithms, threshold signature algorithms and/or the like support creation of the aggregated encrypted response even if not all computing nodes of the community network have provided their respective encrypted responses. These partial secret schemes may be configured to support creation of the aggregated encrypted response in case a sufficient number of computing nodes have responded with their respective encrypted responses.

Optionally, the validating device may simultaneously issue a plurality of queries to the community of computing nodes and receive multiple multi-party consensus answers each corresponding and correlated with a respective one of the plurality of issued queries. Simultaneously in this context does not necessarily indicate simultaneous in time but rather that while the validating device may serially issue a plurality of queries, the validating device may also issue one or more queries before receiving answers to one or more previously issued queries.

According to some embodiments of the present invention, there are provided methods, systems and computer program products for establishing the unidirectional secure channels between the validating device and each of the plurality of computing nodes using one or more trusted device which may distribute to one or more of the computing nodes encryption keys that are reproducible by the validating device.

As stated herein before, the validating device may establish the unidirectional secure channel with each of the computing nodes by encrypting data transmitted to the respective computing node using a unique encryption key associated with the respective computing node. Due to the limitation of the validating device, the unique encryption key of each computing node may be manually provided (typed in) to the validating device as a limited length string. Since the number of computing nodes in the community network may be significantly large, manually feeding the encryption keys may present a major limitation.

To overcome this limitation, one or more trusted controllers may be deployed to generate deterministic encryption-decryption key pairs for one or more of the computing nodes. In particular, the trusted controller(s) may generate each deterministic encryption-decryption key pairs using a pseudorandom number generator initialized with a random seed shared in advance with the validating device. Having the same (shared) random seed, the validating device may initialize its own pseudorandom number generator with the shared random seed to deterministically generate the encryption key of the encryption-decryption key pair generated for the respective computing node by the trusted controller. The validating device may then use the encryption key to establish the secure channel with the respective computing node.

The same approach may be expanded for generate deterministic encryption-decryption key pairs for a plurality of computing nodes by using the pseudorandom number generator initialized with the shared random seed coupled with an index of the respective computing node. The validating device may initialize its own pseudorandom number generator with the shared random seed coupled with the index of the respective computing node to deterministically generate the encryption key of the encryption-decryption key pair generated for the respective computing node.

Moreover, in order to increase data integrity and improve security of the secure channels as well as to allow seamless replacement of computing nodes in the network, the trusted controller may periodically generate new deterministic encryption-decryption key pairs for one or more of the computing nodes. This may be accomplished by using the pseudorandom number generator initialized with the shared random seed coupled with a time index (e.g. time stamp of the time of generation). The validating device may initialize its own pseudorandom number generator with the shared random seed coupled with the time index to deterministically generate the encryption key of the encryption-decryption key pair generated for the respective computing node.

The validation scheme described herein may be applicable for several honest versus malicious computing nodes deployments. Assuming K honest computing nodes are required out of a total of N computing nodes where $$K > \frac{N}{2}.$$

Naturally the validation is fully applicable for scenarios in which there are no malicious computing nodes. In case of 1 to N−K malicious computing nodes, the validation may be applicable depending on the selected partial secret scheme and/or algorithm. In such scenarios, while the malicious computing node(s) may fail the validation process such that the aggregated response reflects a manipulated multi-party consensus answer, the malicious computing nodes are unable to deceive the validating device which will determine the received answer invalid. Moreover, in such scenarios in case the access computing node is honest (i.e. not malicious), one or more partial secret schemes and/or algorithms support detection of one or more of the malicious computing nodes as described herein after. Furthermore, depending on the selected partial secret scheme and/or algorithm, one or more of the malicious computing nodes may be identified prior to inserting the limited length string to the validating device as described herein after. Optionally, the malicious computing nodes are discarded from the community network and the honest access computing node may initiate the multi-party consensus session again to provide an aggregated response corresponding to a possible valid answer. In case of N−K+1 to K−1 malicious computing nodes, the validation may be applicable depending on the selected partial secret scheme and/or algorithm. In such scenarios, while the malicious computing node(s) may fail the validation process such that the aggregated response reflects a manipulated multi-party consensus answer, the malicious computing nodes are unable to deceive the validating device which will determine the received answer invalid. Moreover, in such scenarios in case the access computing node is honest, one or more partial secret schemes and/or algorithms support detection of one or more of the malicious computing nodes as described herein after. The access computing node may issue a notification indicating of the multitude of malicious computing nodes and notifying that the community network may be compromised and hence unreliable. However, in case there are K or more malicious computing nodes, the validation process may be tampered since the malicious computing nodes may manipulate the aggregated response corresponding to a multi-party consensus answer desired by the malicious computing nodes. In such cases the malicious computing nodes may deceive the validating device to determine that the manipulated aggregated response is valid and hence the received multi-party consensus answer is valid. However, even if there are K or more malicious computing nodes in case the access computing node is honest, using some of the partial secret schemes and/or algorithms, the access computing node may dictate being the final computing node to provide the response which is aggregated with the responses received from other computing nodes to produce the aggregated response. In such cases the honest access computing node may be able to identify the manipulated response and may be able to prevent deceiving the validating device.

Validating the multi-party consensus answer at the validating device using the partial secret schemes may present significant advantages and benefits. First, the community network comprising untrusted computing nodes may include malicious nodes which may attempt to manipulate the answer to the query issued by the validating device. By validating the answer, the validating device may identify that the answer was manipulated and is hence unreliable and may not be trusted. This may significantly improve data integrity and robustness of the validating device against malicious manipulation of the responses provided by the community network. This advantage is greatly emphasized in light of the fact that the validation is carried out while the validating device is completely isolated from receiving data from the network and is therefore highly immune to malicious attacks.

Moreover, by detecting the presence and optionally the identity of the malicious computing node(s), such computing node(s) may be discarded from the community network and optionally replaced with other computing nodes thus significantly improving integrity of the community network, specifically the integrity of the network.

Furthermore, issuing queries having a finite number of possible valid answers may significantly reduce the computing resources, for example, processing power, processing time, storage capacity and/or the like required to compute and store the locally computed strings computed for each of the possible valid answers in order to validate the multi-party consensus answer. This in turn may significantly reduce the complexity and/or the cost of the validating device which may require significantly reduced computing resources. Moreover, as there are a number of possible valid answers, the communication capacity, i.e. the volume of data transmitted from the validating device to the computing nodes may be limited and typically significantly low. This may significantly simplify the validating device, specifically the unidirectional channel used for transmitting messages to the access device and may further reduce the complexity and/or cost of the validating device.

Also, using the partial secret schemes which allow responding to the validating device with the aggregated encrypted response even when only a part (and not all) of the computing nodes of the community network are responsive may significantly reduce the dependency on each computing node. This may be highly desirable since typically some of the computing nodes may be offline and/or unreachable.

In addition, applying the hash function to the aggregated encrypted response aggregating the encrypted responses received from at least some of the computing nodes to create the limited length string may allow for generating relatively short strings which may be manually provided (inserted) to the validating device through the user interface of the validating device. The effort intensive, tedious and error prone process of manually inserting (typing) long strings into the validating device may therefore be significantly reduced.

Establishing the secure channels between the validating device and the computing nodes by using the deterministic encryption-decryption keys automatically generated by the trusted controller may further reduce the need for the user to manually interact with the validating device to input encryption keys associated with the respective computing nodes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of validating a multi-party consensus by a validating device having limited connection, according to some embodiments of the present invention. An exemplary process 100 may be executed by a validating device having limited connectivity (connection). In particular, the validating device may have a unidirectional (one-way) secure connection which is physically tamper resistant for outputting (transmitting) data at one or more devices and a limited input interface for receiving manually and/or automatically inserted limited data volumes, in particular limited length strings comprising a limited number of characters (e.g. letters, digits, signs, symbols, etc.). Being highly isolated from any network, the validating device is therefore highly robust and immune to compromising by network attacks initiated by malicious parties.

The validating device may transmit one or more queries to a community network comprising a plurality of computing nodes, specifically untrusted computing nodes adapted to engage in multi-party sessions for selecting multi-party consensus answers to queries submitted to the community network, for example, a blockchain network and/or the like. In particular, the validating device transmits query(s) having a finite number of possible valid answers.

After at least some of the plurality of computing nodes agree on a multi-party consensus answer, each of the at least some computing nodes may generate a respective response based on the agreed multi-party consensus answer encrypted using a respective one of a plurality of partial secret components each associated with a respective one of the plurality of computing nodes.

The plurality of responses received from the at least some computing nodes are aggregated to create an aggregated response. Based on the aggregated response a limited length string is computed using one or more techniques, for example, applying a hash function to the aggregated response to produce a fixed limited length string comprising a fixed limited number of characters.

The limited length string is provided to the validating device through the limited input interface, for example, typed by the user who may receive the limited length string from one or more of the community network's computing nodes and/or a networked device communicating with one or more of the computing nodes.

Independently of the computing nodes of the community network, the validating device may locally compute a plurality of strings each computed based on a respective one of the finite number of possible valid answers manipulated (encrypted) using an aggregated secret aggregating the plurality of partial secret components.

The validating device may then validate the multi-party consensus answer by comparing (matching) the received limited length string to each of the plurality of locally computed strings. In case of a match the validating device may determine the multi-party consensus answer is valid, i.e. the multi-party consensus answer is one of the possible valid answers. However, in case of no match the validating device may determine the multi-party consensus answer is invalid, i.e. the multi-party consensus answer is not one of the possible valid answers. The validating device may further initiate one or more operations based on the outcome of the validation. For example, the validating device may output the outcome of the validation, for example, present the outcome to the associated user and/or the like. In another example, the validating device, for example, a cold wallet may initiate one or more cryptocurrency transactions based on the outcome of the validation.

An invalid answer may result from a failure to input the limited length string to the validating device, for example, the user mistyping the limited length string received from the community network. However, the invalid answer may result from a presence of one or more malicious computing nodes among the at least some computing nodes which attempt to fraudulently manipulate the answer. In such case, the validating device may indicate the user of a potential malicious computing node(s) among the plurality of computing nodes.

Figure 2:
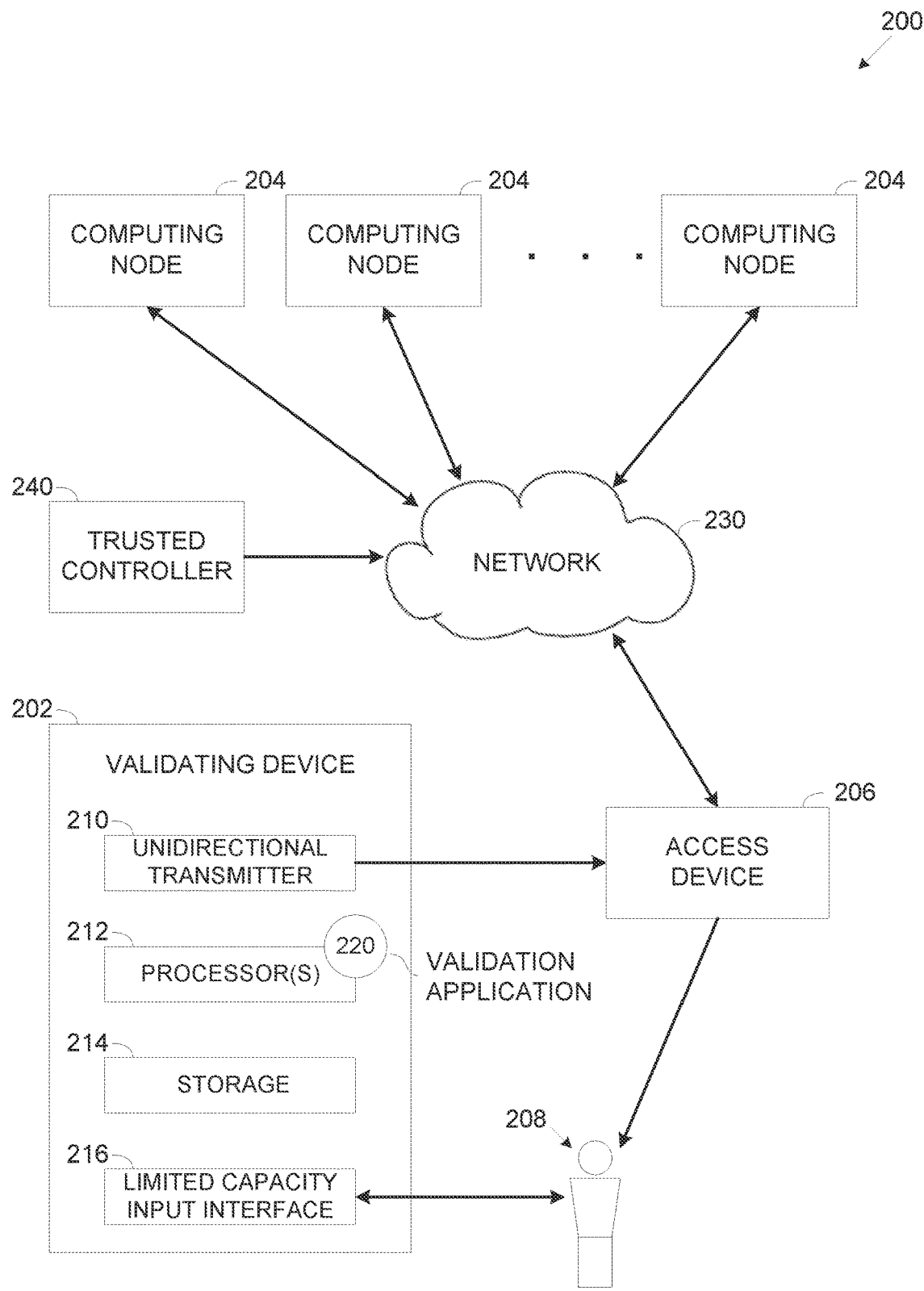
FIG. 2 is a schematic illustration of an exemplary system for validating a multi-party consensus by a validating device having limited connection, according to some embodiments of the present invention.

Reference is also made to FIG. 2, which is a schematic illustration of an exemplary system for validating a multi-party consensus by a validating device having limited connection, according to some embodiments of the present invention. An exemplary system 200 may include a validating device 202 adapted to validate information received from a community network consisting of a plurality of computing nodes 204, for example, a computer, a server, a processing node, a network node, a cloud computing resource, a Smartphone, a tablet and/or the like capable of communicating with each other via a network 230 comprising one or more wired and/or wireless networks, for example, a Local area Network (LAN), a Wireless LAN (WLAN), a Wide Area Network (WAN), a Municipal Area Network (MAN), a cellular network, the internet and/or the like.

According to some embodiments of the present invention, the community network is composed of untrusted computing nodes 204 forming a blockchain network applied to maintain a private, public and/o consortium blockchain facilitating a distributed ledger for one or more applications, for example, cryptocurrency, smart contracts, distributed database and/or the like.

The validating device 202 may typically be a proprietary device comprising a unidirectional transmitter 210 to facilitate a unidirectional (one-way) secure communication channel with one or more other devices, a processor(s) 212 for executing a process such as the process 100 and storage 214 for storing program code (program store) and/or data. The validating device 202 may further include a secure limited capacity input interface 216 for receiving limited and typically very low volume data. The validating device 202 may be associated with a user 208.

According to some embodiments of the present invention, specifically for the cryptocurrency blockchain applications, the validating device 202 may facilitate a cold wallet used to store a cryptocurrency account of the associated user 208 while disconnected and thus isolated from the network 230. As such the cold wallet may be highly immune to networks based malicious attacks directed to compromise the cold wallet and access the account information and possibly transfer cryptocurrency funds from the wallet.

The unidirectional transmitter 210 may include one or more wired, wireless and/or optical transmitting interfaces adapted for data transmittal only and thus unable to receive data. The unidirectional transmitter 210 may be physically tamper resistant such that compromising data transmitted from the unidirectional transmitter 210 is impossible and/or detectable and reported. Moreover, the unidirectional transmitter 210 may transmit encrypted data thus forming a reliable and secure unidirectional (one-way) communication channel. The unidirectional transmitter 210 may include for example, a light based (e.g. infrared, laser, etc.) transmitter configured for optically encoding data. In particular, the unidirectional transmitter 210 may transmit a directed light pattern directed to a specific receiver which may not be intercepted by potentially malicious devices. In another example, the unidirectional transmitter 210 may include a fiber optic transmitter, for example, a data diode (unidirectional gateway) transmitter configured for transmitting data in only one direction over an optical fiber channel. In another example, the unidirectional transmitter 210 may include a wired and/or wireless transmitter, for example, a serial transmitter, a Radio Frequency (RF) transmitter configured for transmitting data over wire and/or over the air. In another example, the unidirectional transmitter 210 may include a display, for example, a screen, a projector and/or the like for displaying a QR code encoding data which may be scanned and recovered for transmission to one or more of the computing nodes 204.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a validation application 220 for executing the process 100. The validation application 220 may further utilize and/or facilitate one or more hardware elements integrated and/or coupled with the validating device, for example, a circuit, a component, an Integrated Circuit (IC), an Application Specific Integrated Circuit (ASIC), a Field Programmable Gate Array (FPGA), a Digital Signals Processor (DSP) and/or the like. For example, the validation application 220 may use a Hardware Security Module (HSM) to utilize one or more functions, for example, one or more hardware modules, for example, public key infrastructures (PKIs), message signing, key injection, database encryption and/or the like.

The limited capacity input interface 216 is capable of receiving limited and typically very low volume of data, for example, limited length strings comprising a limited number of characters (e.g. letters, digits, signs, symbols, etc.) which may be manually and/or automatically inserted. For example, the limited capacity input interface 216 may include one or more user interfaces such as, for example, a keyboard, a touchscreen and/or the like for interacting with the user 208 to receive textual strings of data typed in by the associated user 208. In another example, the limited capacity input interface 216 may include a computer punched card reader configured to read data, for example, strings encoded in one or more punched cards inserted manually and/or automatically to the computer punched card reader. The user interface may further include one or more output interfaces, for example, a display, a speaker, an earphone and/or the like for outputting data to the user 208.

Due to the nature and deployment of the computing nodes 204 which may be located in different geographical locations, the validating device 202 may communicate with one or more of the computing nodes 204 via one or more access devices 206 connected to the network 230. The access device 206 may receive data from the validating device 202 through the unidirectional secure communication channel facilitated by the unidirectional transmitter 210 and broadcast the received data to one or more of the computing nodes 204 over the network 230. For example, the access device 206 may include an optic receiver configured to receive optically encoded data transmitted by the light source unidirectional transmitter 210 of the validating device 202. In another example, the access device 206 may include a fiber optic receiver, for example, a data diode receiver configured to receive data transmitted over an optical fiber channel from the data diode transmitter 210 of the validating device 202. In another example, the access device 206 may include a wired and/or wireless receiver configured to receive data transmitted by the wired and/or wireless unidirectional transmitter 210 of the validating device 202. In another example, the access device 206 may include a scanner configured to scan and recover data from a QR code generated and displayed by the display unidirectional transmitter 210 of the validating device 202.

The access device 206 may be facilitated, for example, by one or more access computing nodes 206 such as the computing nodes 204 accessible to the user 208, for example, a Smartphone, a tablet, a computer, a server and/or the like. In another example, the access device 206 may include a networked device, specifically a networked device accessible to the user 208, for example, a Smartphone, a tablet, a laptop, a desktop, a smart watch, smart glasses and/or the like which are not part of the community network of computing nodes 204 but capable of connecting to the network 230 for communicating with one or more of the computing nodes 204.

Moreover, the access device 206 may be used to present to the user 208 information received from the community network of computing nodes 204. For example, the access device(s) 206 may present a multi-party consensus answer and/or response received from the community network of computing nodes 204. Moreover, the access device(s) 206 may present a limited length string computed based on a multi-party consensus answer and/or an aggregated response aggregating a plurality of responses received from at least some of the computing nodes 204. As such, specifically in case the validating device 202 is the cold wallet storing the cryptocurrency account of the user 208, the access device 206 may be regarded as a hot wallet, i.e. connected to the network 230.

Furthermore, according to some embodiments of the present invention, specifically for the cryptocurrency blockchain applications, the validating device 202 may be a cold wallet used to store a cryptocurrency account of the associated user 208.

As described herein before, the data transmitted by the validating device 202 over the unidirectional secure communication channel facilitated by the unidirectional transmitter 210 may be encrypted. In particular, the validating device 202 may use an encryption key of an encryption-decryption key pair uniquely associated with each of at least some of the computing nodes 204 to encrypt the data transmitted to the respective computing node 204 thus establishing a unidirectional secure and reliable channel with each of the at least some computing nodes 204. As such the unique encryption key associated with each computing node 204 serves as an address of the respective computing node 204. The encryption-decryption key pair associated with each of the at least some computing nodes 204 may be, for example, a private-public key pair and/or the like.

To facilitate the encrypted data transmission, the encryption key of each of the at least some computing nodes 204 must be available to the validating device 202. The encryption key of each of the at least some computing nodes 204 may be provided to the validating device 202 using one or more techniques.

For example, the encryption key associated with each of one or more of the computing nodes 204 may be provided to the validating device 202 through the limited capacity input interface 216, for example, as a limited length string inserted (typed in) by the user 208 typically the user 208 associated with the validating device 202 or encoded in one or more punched cards inserted manually and/or automatically to the limited capacity input interface 216.

In another example, the encryption key associated with each of one or more of the computing nodes 204 is made available to the validating device 202 using one or more trusted controllers 240. The trusted controller 240 may be very similar to the validating device in the sense that it is highly isolated from any network such as the network 230 thus the trusted controller 240 is highly robust and immune to compromising by network attacks initiated by malicious parties. The trusted controller 240 may include a unidirectional transmitter such as the unidirectional transmitter 210 for transmitting data to one or more of the computing nodes either directly or through one or more access devices such as the access device 206.

Moreover, the trusted controller 240 may establish a secure channel with each of one or more of the computing nodes 204 by encrypting the data transmitted to the respective computing nodes 204 using an encryption key uniquely associated with the respective computing nodes 204 as described for the secure channel established by the validating device 202. The trusted controller 240 may further include a limited capacity input interface such as the limited capacity input interface 216, for example, a user interface for receiving limited length strings from one or more users, specifically for managing the community network of computing nodes 204, for example, an operator, an administrator, a technician and/or the like. In another example, the trusted controller 240 may receive limited length strings encoded in one or more computer punch cards inserted manually and/or automatically to a computer punch card reader of the trusted controller 240.

Through its limited capacity input, the trusted controller 240 may be updated continuously, periodically and/or on demand with the status of the computing nodes 204 in the community network, for example, an identity of computing node(s) 204 which are added to the community network, the identity of computing node(s) 204 removed from the community network, the identity of computing node(s) 204 detected as malicious computing nodes and/or the like.

The trusted controller 240 may be further operated to generate the encryption-decryption key pair used for encrypting and decrypting the data transmitted from the validating device 202 to one or more of the computing nodes 204. In particular, the trusted controller 240 may deterministically generate an encryption-decryption key pair uniquely associated with a respective one of one or more of the computing nodes 204. The trusted controller 240 may produce each deterministic encryption-decryption key pair using a pseudorandom number generator initialized with a random seed shared in advance with the validating device 202. The trusted controller 240 may then distribute each encryption-decryption key pair to the respective computing node 204 through the unidirectional secure channel established between the trusted controller 240 and the respective computing node 204. The validating device 202 in turn may initialize a pseudorandom number generator integrated in it with the shared random seed to deterministically generate the encryption key of the encryption-decryption key pair generated for the respective computing node 204 by the trusted controller 240. The validating device 202 may then use the encryption key to establish the secure channel with the respective computing node 204.

Optionally, the trusted controller 240 periodically produces a new deterministic encryption-decryption key pair for one or more of the computing nodes 204 every predefined period of time, for example, every day, every week and/or the like. In such case, the trusted controller 240 may produce the new encryption-decryption key pair using the pseudorandom number generator initialized with the random seed shared with the validating device 202 and a time identifier assigned to the new encryption-decryption key. The time identifier, for example, a time stamp and/or the like may uniquely express the time of producing the new encryption-decryption key pair. The time identifier may be an absolute time stamp, for example, a day, a date, a time and/or the like. The implementation of the time identifier is naturally predefined to synchronize between the trusted controller 240 and the validating device 202. The validating device 202 in turn may initialize its pseudorandom number generator with the shared random seed and the time identifier to deterministically generate the encryption key of the encryption-decryption key pair generated for the respective computing node 204 by the trusted controller 240. The validating device 202 may then use the encryption key to establish the secure channel with the respective computing node 204. Periodically producing encryption-decryption key pairs for one or more of the computing nodes 204 may allow adding, removing and/or replacing computing nodes 204 seamlessly to the validating device 202 which is able to produce the encryption key of the encryption-decryption key pairs associated with each computing node 204 mapped by the trusted controller 240.

In case the trusted controller 240 produces a plurality of deterministic encryption-decryption key pairs each uniquely associated with a respective one of multiple computing nodes 204, the trusted controller 240 may generate each encryption-decryption key pair using an index assigned to the respective computing node 204. The validating device 202 in turn may initialize its pseudorandom number generator with the shared random seed and the index assigned to each computing node 204 to deterministically generate the encryption key of the encryption-decryption key pair generated for the respective computing node 204 by the trusted controller 240. The validating device 202 may then use the encryption key to establish the secure channel with the respective computing node 204.

The process 100 and the system 200 are described for a single validating device 202 associated with a single user 208 and connecting to the network 230 via a single access device 206. However, this should not be construed as limiting since the process 100 and the system 200 may be expanded to a plurality of validating devices such as the validating device 202 associated with respective users 208 and connecting to the network 230 via multiple access devices such as the access device 206.

Moreover, the process 100 is basically described for a single query issued at a time by the validating device 202 to the community network of the plurality of computing nodes 204. However, this should not be construed as limiting since the validating device 202 may simultaneously issue a plurality of queries to the community of computing nodes 204 and in return receive from the community multiple multi-party consensus answers each corresponding and correlated with a respective one of the plurality of issued queries. The multi-party consensus answers may be each correlated with its respective query using a unique query identifier (ID) assigned to each query by the validating device 202 and included in each of the responses transmitted by the computing nodes 204 in response to the respective query. The multi-party consensus answer created for the respective query by aggregating the responses transmitted by the computing nodes 204 in response to the respective query may also include the query ID of the respective query. Therefore, using the query IDs, the validating device 202 may correlate each multi-party consensus answer with its respective one of the plurality of simultaneously issued queries. The term simultaneous should not be construed literally as simultaneously transmitting multiple queries at the same time but rather that several queries may be issued before receiving answers to previous queries.

Also, for clarity the validating device 202 is described to execute the process 100 herein after. However, it should be clear that the validation application 220 executed by the processor(s) 212 of the validating device 202 is the software module which in fact executes the process 100.

As shown at 102, the process 100 starts with the validating device 202 creating one or more queries for transmission to the community network of the plurality of computing nodes 204 of in order to receive a multi-party consensus answer agreed by at least a majority of the computing nodes 204. In particular, the query may have a finite number of possible valid answers. Moreover, the finite number of possible valid answers may typically be relatively small.

For example, assuming the community network of computing nodes 204 forms a blockchain network, the query may relate to requesting information relating to the validating device 202, for example, a query for confirming data stored by the validating device 202, a query for confirming interactions made by the validating device 202 with one or more of the computing devices 204 and/or the like. More specifically, assuming the community network comprising the computing devices 204 is the cryptocurrency blockchain network and the validating device 202 is the cold wallet of the associated user 208, the query may relate to information relating to cryptocurrency transactions conducted by the validating device 202. For example, the query may be issued to check a cryptocurrency balance of the cold wallet. In such case, the finite number of possible valid answers may be, for example, between 0 and 100, between 100 and 200, between 200 and 300 and so on. In another example, the query may be issued to check a number of cryptocurrency transactions made to the cold wallet. In such case, the finite number of possible valid answers may be, for example, between 0 and 10, between 10 and 20, between 20 and 30 and so on. In another example, the query may be issued to check a value of a cryptocurrency transaction made to a certain destination (another wallet). In such case, the finite number of possible valid answers may be, for example, between 0 and 1, between 1 and 2, between 2 and 3 and so on. In another example, the query may be issued to check correctness a certain data item stored in the cold wallet, such as number of cryptocurrency transactions made from the cold wallet. In such case, the finite number of possible valid answers may be two, namely correct or incorrect.

In another example, which also applies to a use case in which the validating device 202 is the cold wallet, the query may be directed to receiving approval to conduct one or more operations, specifically to make one or more cryptographic transactions. For example, assuming the cold wallet validating device 202 is used to make cryptographic transactions to clients. Further assuming a total value of cryptographic transactions allowed for the cold wallet validating device 202 is limited to a certain value, for example, 100 bitcoins per a predefined time period, for example, a day, a week, a month and/or the like. The cold wallet validating device 202 may create and transmit to the community network a query seeking approval for increasing the total value of cryptographic transactions allocated for the predefined time period by a certain sum, for example, 70 bitcoins. The cold wallet validating device 202 may transmit such query to a community network comprising a plurality of computing nodes 204 authorized to approve such increase of the total value of cryptographic transactions for the cold wallet validating device 202, optionally after communicating among themselves to reach agreement and decide on a multi-party consensus answer. i.e. an approved cryptocurrency value. One or more of the authorized computing nodes 204 may be manually operated by respective authorized users, for example, a manager, a super user and/or the like. However, one or more of the authorized computing nodes 204 may operate automatically in accordance with one or more predefined authorization rules, for example, a rule defining additional funds allowed for cryptocurrency transactions optionally per time period, a rule defining maximum funds allowed for cryptocurrency transactions to specific address(s) (other cryptocurrency wallets) and/or the like.

As shown at 104, the validating device 202 computes a plurality of locally computed strings each corresponding to a respective one of the finite number of possible valid answers to the query. Moreover, the validating device 202 computes each locally computed string for a result of a respective possible valid answer manipulated using an aggregated secret aggregating a plurality of partial secret components which are distributed to the plurality of computing nodes 204 as described herein after. Optionally, the manipulation is applied to the respective possible valid answer coupled with additional data such as, for example, the time stamp.

The validating device 202 may apply one or more methods, techniques and/or algorithms to compute the plurality of locally computed strings based on the result of the manipulation of the possible valid answers and optionally the additional data. For example, the validating device 202 may compute each locally computed string by applying one or more hash functions to each of the results corresponding to each of the finite number of possible valid answers to produce a respective limited length string having a predefined length, i.e. a predefined number of characters.

Optionally, in case the validating device 202 identifies that two or more locally computed strings computed based on different possible valid answers produce equal values, the validating device 202 computes new locally computed strings for at least some of the plurality of possible valid answers. The validating device 202 may compute the new locally computed strings based on adjusted base value, for example, a current time identifier.

As shown at 106, the validating device 202 transmits the query to each of at least some of the plurality of computing nodes 204 via the unidirectional secure channel established with each of the computing nodes 204.

Optionally, the validating device 202 signs the query with a signature uniquely associated with the validating device 202 to authenticate the validating device 202 as the originator of the query to the any of the computing nodes 204 receiving the query. The validating device 202 may apply one or more authentication methods, techniques and/or algorithms as known in the art to sign the query, for example, a private-public key scheme in which the public key of the validating device 202 may be distributed and used to authenticate the query encrypted by the validating device 202 using the respective private encryption key which is kept secret and available only to the validating device 202.

Optionally, the validating device 202 couples the query with a unique identifier transmitted with the query to uniquely identify the specific query. The computing nodes 204 responding to the query may include the unique identifier of the query into their responses and moreover in the multi-party consensus response provided to the validating device 202. Using the unique identifier, the validating device 202 may therefore associate the multi-party consensus response received for the query with the specific query. This may serve to prevent replay attacks in which a malicious party, i.e. one or more malicious computing nodes may attempt to fraudulently issue a query replicating a query previously transmitted by the validating device. The unique identifier coupled with the query may be set using one or more methods, techniques and/or implementations. For example, the unique identifiers may be based on a time stamp of the transmission time of the query, for example, a concatenation of date, hour, minute and seconds and/or the like. In another example, the unique identifiers may be based on a randomized nonce uniquely selected for each query.

The validating device 202 may transmit the query as a single signed message broadcasted to the network 230 and hence to all of the computing nodes 204. However additionally and/or alternatively, the validating device 202 may transmit the query as a signed and encrypted message transmitted separately to at least some of the plurality of computing nodes 204.

At least some of the computing nodes 204 which received the query transmitted by the validating device 202 may each select one of the finite number of possible valid answers identified for the query. Each honest computing nodes 204 (i.e. not malicious nodes) of at least some of the computing nodes 204, specifically at least a majority of the computing nodes 204 selects the answer based on information transparently available to members of the community network as known in the art, for example, the blockchain network and/or the like.

As described herein before, based on the employed partial secret scheme, the partial secret components may be distributed to the computing nodes 204 in advance during the initialization process prior to issuing any query and/or the partial secret components may be distributed to the computing nodes 204 together with the query.

One or more of the computing nodes 204 may optionally communicate with one or more other computing nodes 204 as known in the art to engage in a multi-party session to identify, decide (agree on) and select the possible valid answer to the query.

Based on the possible valid answer identified (agreed and decided) for the query by at least the majority of computing nodes 204, a multi-party consensus answer reflecting the agreed possible valid answer is selected.

Each of at least the majority of computing nodes 204 provides a respective response computed based on the possible valid answer selected by the respective computing node 204 using a respective one of the plurality of partial secret components associated with the respective computing node 204. Since each partial secret component is only available to its respective computing node 204, each response is computed such that none of the computing nodes 204 may be able to decipher the responses provided by any of the other computing nodes 204. The partial secret components may be implemented using one or more methods, techniques and/or algorithms as described herein after. As stated before for the aggregated secret, the plurality of partial secret components constituting the aggregated secret may be implemented using one or more methods, techniques and/or algorithms as described herein after.

According to some embodiments as described herein after, the plurality of partial secret components are provided by the validating device 202 to at least some of the plurality of computing nodes 204 in advance during an initialization process, i.e. prior to transmitting the query. The validating device 202 transmits a respective one of the partial secret components to each of the computing nodes 204 via the unidirectional secure channel established with the respective computing node 240. Specifically, the validating device 202 encrypts each partial secret component using the encryption key of the respective encryption-decryption key pair uniquely associated with the respective computing node 204. The validating device 202 may optionally sign one or more of the partial secret components transmitted to the respective computing nodes 204 with the signature uniquely associated with the validating device 202 to authenticate the validating device 202 as the originator of the transmitted partial secret components.

According to some embodiments as described herein after, the plurality of partial secret components are transmitted by the validating device 202 to at least some of the computing nodes 204 in conjunction with the query. In such case, the validating device 202 may individually transmit the query to each of the at least some computing nodes 204 via the unidirectional secure channel established with the respective computing node 204 where each individual query comprises a respective one of the plurality of partial secret components assigned to the respective computing node 204.

Depending on the implementation, the validating device 202 may therefore broadcast the query once to all of the computing nodes 204 connected to the network 230 or individually transmit the query to each of the computing nodes 204 via the unidirectional secure channel established with the respective computing node 204.

One or more of the computing nodes 204 may compute a limited length string based on an aggregated response which aggregates the plurality of responses received from at least the majority of computing nodes 204. For example, the limited length string may be computed by the access computing node 206. One or more methods, techniques and/or algorithms may be applied to compute the limited length string may be based on the aggregated response. For example, the limited length string may be computed by applying one or more hash functions to the aggregated response to produce a limited length string having a predefined length, i.e. a predefined number of characters.

As shown at 108, the validating device 202 receives the limited length string computed based on the aggregated response aggregating the plurality of responses computed and received from at least some of computing nodes 204. The validating device 202 receives the limited length string via the secure limited capacity input interface 216 which may be operated manually and/or automatically. For example, the validating device 202 may receive the limited length string via the secure user input interface such as, for example, the keyboard, the touchscreen and/or the like operated by the user 208 to insert the limited length string. In another example, the validating device 202 receives the limited length string encoded in one or more computer punch cards manually and/or automatically inserted to a computer punch card reader provided by the limited capacity input interface 216.

For example, the user 208 may obtain the limited length string from the access device 206 which is connected to the network 230 and may hence communicate with one or more of the computing nodes 204 to receive the limited length string. In particular, in case the access device 206 accessible to the user 208 is the access computing node 206 which is part of the community network comprising the computing nodes 204, the access computing node 206 may be selected to compute the limited length string. However, in case the access device 206 is not part of the community network of computing nodes 204, the access device 206 may communicate over the network 230 with one or more of the computing nodes 204 to receive the limited length string computed by one or more of the computing nodes 204.

The access device 206 may present the limited length string to the user 208 through one or more output user interfaces of the access device 206, for example, a display, a screen, a speaker, an earphone and/or the like. The user 208 may then operate the input user interface (limited capacity interface 216) of the validating device 202 to input (type in) the limited length string. As such the user 208 acts as an intermediator between the access device 206 which is connected to the network 230 and the validating device 202 which is isolated from the network 230. In another example, the access device 206 may produce one or more computer punch cards which encode the limited length string.

In another example, the access device 206 using an integrated and/or electronically coupled computer punch card punching machine may produce one or more computer punch cards encoding the limited length string. The computer punch card(s) may be manually inserted by the user 208 to the computer punch card reader of the validating device 202. Optionally, the computer punch card(s) are automatically inserted to the computer punch card reader of the validating device 202 using an automated mechanical mechanism and/or interface, for example, a robotic arm configured to collect the computer punch card(s) from a punching machine operated by the access device 206 and deliver the computer punch card(s) to the computer punch card reader of the validating device 202.

It should be noted that even in case the access computing node 206 is a malicious computing node, the access computing node 206 may not be able to deceive the validating device 202. Since similarly to any of the computing nodes 204, the access computing node 206 has no access to any of the other partial secret components except its own, any attempt of the access computing node 206 to generate a manipulated limited length string to be provided to the validating device 202 is based on guessing. However, the space of possibilities of the limited length string which depends on the number of characters in the limited length string may be an extremely large, for example, between $10^6$ and $10^9$. The guessing is therefore most likely to fail because the validating device 202 may detect the invalidity of the answer expressed by the manipulated limited length string.

As shown at 110, the validating device 202 validates the multi-party consensus answer by comparing the received limited length string to each of the plurality of locally computed strings.

In case of a match, the validating device 202 may determine the multi-party consensus answer is valid, i.e. the multi-party consensus answer is one of the possible valid answers. However, in case of no match the validating device 202 may determine that the multi-party consensus answer is invalid, i.e. the multi-party consensus answer is not one of the possible valid answers. The invalid answer may result from a failure to properly input the limited length string to the validating device 202, for example, the user 208 mistyping the limited length string received from the community of computing nodes 204. However, the invalid answer may result from the presence of one or more malicious computing nodes among the at least some computing nodes 204 attempting to fraudulently manipulate the multi-party consensus answer to their advantage.

As shown at 112, the validating device 202 may initiate one or more operations based on the outcome of the validation.

For example, the validating device 204 may output the outcome of the validation. In particular, the validating device 202 may present the outcome to the associated user 208. For example, the validating device 202 may operate one or more of the output user interfaces, for example, the display, the speaker, the earphone and/or the like to present the validation outcome to the user 208. In case the validating device 202 determined that the multi-party consensus answer is invalid, the validating device 202 may further output (present) to the user 208 one or more indications and/or messages informing the use 208 of a potential malicious computing node (malicious party) among the plurality of computing nodes 204. For example, the validating device 202 may operate the display, the speaker, the earphone and/or the like to present the malicious party indication to the user 208.

In another example, the validating device 202, for example, the cold wallet may initiate one or more cryptocurrency transactions. For example, the query issued by the validating device may be directed to determine the balance of cryptocurrency at the cold wallet validating device 202. Based on the validated multi-party consensus answer, the cold wallet validating device 202 may determine whether there are sufficient cryptocurrency funds for one or more cryptocurrency transactions and may initiate transmission of the cryptocurrency transaction(s) accordingly. This means that in case according to the multi-party consensus answer which is validated by the cold wallet validating device 202, there are sufficient cryptocurrency funds, the cold wallet validating device 202 may transmit the cryptocurrency transaction(s). However, in case according to the multi-party consensus answer there are insufficient cryptocurrency funds, the cold wallet validating device 202 may avoid transmitting the cryptocurrency transaction(s).

Optionally, in particular in case the validating device 202 determined that the multi-party consensus answer is invalid, the validating device 202 may request an increased length limited length string received in response to one or more subsequent queries. The validating device 202 may apply this to reduce the probability that a limited length string manipulated by the potential malicious computing node(s) randomly matches one of the possible valid answers to the query.

Optionally, in particular in case the validating device 202 determined that the multi-party consensus answer is invalid, in order to detect the malicious computing node(s) among the computing nodes 204, the validating device 202 publishes to one or more of the computing nodes 204 at least some information relating to the partial secret components associated with the computing nodes 204. The published information may vary according to the exact implementation of the secret and the partial secret components as described herein after. The computing node(s) 204 which receive the published information relating to the partial secret components may identify one or more invalid responses which are incompliant with the multi-party consensus answer and may further identify one or more of the originating computing node(s) 204 which transmitted the incompliant response(s).

After identified, one or more of the computing node(s) 204 suspected and/or determined to be malicious computing node(s) may be discarded from the community of computing nodes 204. Optionally, the discarded computing node(s) 204 is replaced by another computing node(s) 204 which is currently not a member of the group of at least some computing nodes 204 which negotiate the multi-party consensus response to the query and is added to the group.

The process 100 is directed for validating multi-party consensus answers to queries having a limited number of possible valid answers to support validating device 202 having limited computing resources of the, for example, processing power, storage capacity and/or the like thus capable of computing, storing and/or matching only a limited number of locally computed strings. However, the validating device 202 may apply the process 100 in a two-stage query sequence to validate multi-party consensus answers to more complex queries having an extremely large number and possibly an infinite number of possible valid answers.

In a first stage of the two-stage query process, the validating device 202 may apply the process 100 to transmit the complex query to the computing nodes 204. One or more of the computing nodes 204 may decide, optionally communicating with one or more other computing nodes 204, on a multi-party consensus answer to the complex query and may compute a first limited length string based on the multi-party consensus answer. The first limited length string may be then provided to the validating device 202, for example, using the access computing node 206 to provide the limited length string which may be manually and/or automatically inserted to the validating device 202.

In a second stage of the two-stage query process, the validating device 202 may apply the process 100 to transmit a second query to confirm that the received multi-party consensus answer to the complex query is correct. The second query requesting confirmation of the multi-party consensus answer may therefore have two possible valid answers namely correct and incorrect. In response the validating device 202 may receive, for example, through the access computing node 206, a second limited length string computed by at least one of the computing nodes 204 based on a second aggregated response aggregating a plurality of responses computed by at least some of the computing nodes 204 for the multi-party consensus answer decided for the confirmation query. The validating device 202 may then use the aggregated secret aggregating the plurality of partial secret components to compute two locally computed strings, one computed for the answer "correct" and the other computed for the answer "incorrect". The validating device 202 may compare the received second limited length string to each of the two locally computed strings to check for a match.

In case of a match with the locally computed string corresponding to the answer "correct", the validating device 202 may determine that the multi-party consensus answer decided by the community network for the complex query is correct. In case of a match with the locally computed string corresponding to the answer "incorrect", the validating device 202 may determine that the multi-party consensus answer decided by the community network to the for the complex query is incorrect. In case of no match with any of the two locally computed strings, the validating device 202 may determine that there may potential be one or more malicious computing nodes among the at least some computing nodes 204.

Figure 3:
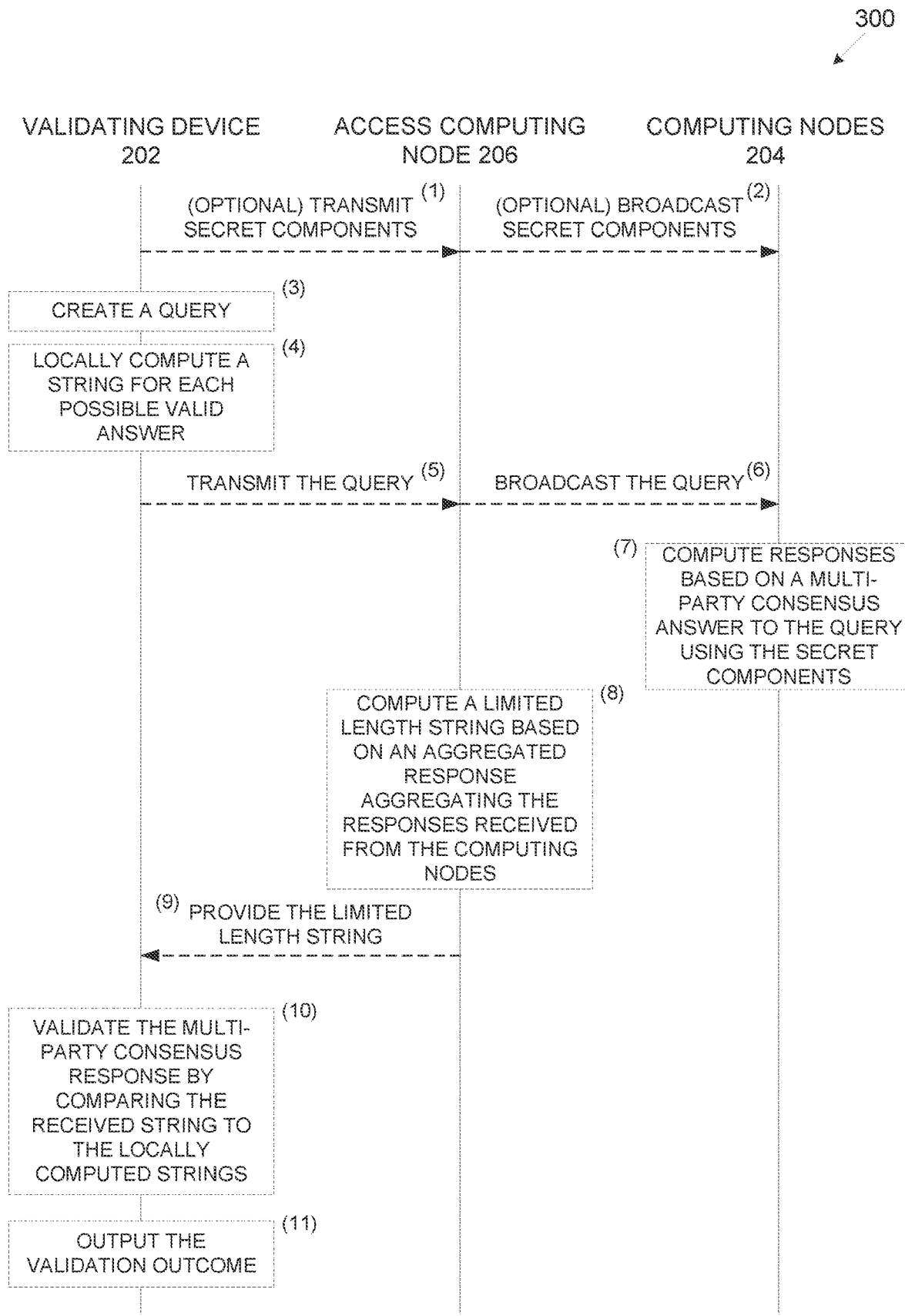
FIG. 3 is a schematic illustration of an exemplary sequence of validating a multi-party consensus by a validating device having limited connection, according to some embodiments of the present invention.

Reference is now made to FIG. 3, which is a schematic illustration of an exemplary sequence of validating a multi-party consensus by a validating device having limited connection, according to some embodiments of the present invention. An exemplary sequence 300 outlines a validation sequence conducted by a validating device such as the validating device 202 executing a process such as the process 100 in attempt to validate a multi-party consensus answer received from a community of computing nodes such as the computing nodes 204 in response to a query issued by the validating device 202. In particular, the sequence 300 is presented for a deployment in which the validating device 202 connects to a network such as the network 230 via an access computing node such as the access computing node 206 for communicating with the computing nodes 204.

As seen in the sequence and described in step 106 of the process 100, the validating device 202 may optionally transmit the plurality of partial secret components to the computing nodes 204 prior to issuing any query. The validating device 202 typically transmits the partial secret components (1) to the access computing node 206 which may distribute the partial secret components (2) to the plurality of computing nodes 204. As described herein before, the partial secret components are transmitted to each of the computing nodes 204 via the secure channel established with each of the computing nodes 204 using the respective encryption key of the encryption-decryption key pair associated with the respective computing node 204.

The validating device 202 may create a query (3) having a finite number of possible valid answers as described in step 102 of the process 100 and may locally compute (4) a plurality of strings each computed for a respective one of the finite number of possible valid answers using an aggregated secret aggregating the plurality of partial secret components as described in step 104 of the process 100. Optionally in case multiple locally computed strings produce and equal value, the validating device 202 may re-compute the plurality of strings based on an adjusted base value as described in step 104 of the process 100.

The validating device 202 may transmit the query (5) to the access computing node 206 which may broadcast the query (6) to the plurality of computing nodes 204 as described in step 106 of the process 100. At least some of the computing nodes 204 may each create a respective response (7) based on a multi-party consensus answer decided and agreed by the community of computing nodes 204 for the query as described in step 106 of the process 100. Each of the at least some computing nodes 204 uses its respective partial secret component to compute its respective response such that the repose may not be revealed to any of the other computing nodes 204. One or more of the computing nodes 204, for example, the access computing node 206 may compute a limited length string (8) based on an aggregated response aggregating the responses received from the at least some computing nodes 204 as described in step 106 of the process 100.

The validating device 202 may receive the limited length string computed by the access computing node 206 and provided (9) as described in step 108 of the process 100. For example, the limited length may be provided by a user such as the user 208 who obtains the limited length string from the access computing node 206 and inserts it using a user interface (i.e. a limited capacity interface such as the limited capacity interface 216) of the validating device 202. In another example, the limited length string may be encoded in one or more computer punch cards produced by the punching machine coupled and/or integrated in the access device 206. The produced computer punch card(s) may be inserted automatically and/or manually to the computer punch cards reader coupled and/or integrated in the validating device 202 (i.e. the limited capacity interface 216).

The validating device 202 may then validate (10) the multi-party consensus answer selected (agreed) by the community of computing nodes 204 by comparing between the received limited length string and each of the locally computed strings as described in step 110 of the process 100. In case of a match between the limited length string and one of the locally computed strings, the validating device 202 may determine the multi-party consensus answer is valid. In contrast, in case of no match between the limited length string and any of the locally computed strings, the validating device 202 may determine the multi-party consensus answer is invalid. The validating device 202 may further output the validation outcome (11), i.e. whether the multi-party consensus answer is valid or not as described in step 112 of the process 100.

As stated herein above the process 100, in particular the implementation of the partial secret components may be facilitated using one or more methods, techniques and/or algorithms.

In a first exemplary implementation, the plurality of secret components are symmetric hash functions $H_1, H_2, \ldots, H_n$. The validating device 202 may transmit a respective one of the symmetric hash functions $H_i$ to each of the plurality of n computing nodes 204. Typically, the validating device 202 transmits the symmetric hash functions once during the initialization process prior to transmitting the query.

The validating device 202 may transmit the query having a finite number of possible valid answers $x_1, x_2, \ldots, x_k$.

Each of (all of) the computing nodes 204 may use its a respective symmetric hash function $H_i$ to compute a respective one of a plurality of hash values $H_i(x_m)$ based on the multi-party consensus answer $x_m$ decided by the community of the plurality of computing nodes 204 for the query. Since each of then computing nodes 204 is associated with a different one of the symmetric hash functions $H_1, H_2, \ldots, H_n$, no other computing node 204 may decipher the hash value computed by another computing node 204.

One or more of the computing nodes 204, for example, the access computing node 206 may compute the limited length string for an aggregated hash value aggregating the plurality of hash values $H_1(x_m), H_2(x_m), \ldots, H_n(x_m)$ computed by the plurality of computing nodes 204. For example, the access computing node 206 may apply a hash function to the aggregated hash value to compute the limited length string which is the output of $H(H_1(x_m), H_2(x_m), \ldots, H_n(x_m))$. The resulting hash value serving as the limited length string may be provided to the validating device 202 through the limited capacity interface 216, for example, by the user 208 using the access computing node 206 to obtain the resulting hash value.

The validating device 202 may use the aggregate secret, i.e. aggregation of the plurality of symmetric hash functions $H_1, H_2, \ldots, H_n$ to compute an aggregated hash value $H_1(x_i), H_2(x_i), \ldots, H_n(x_i)$ for each of the finite number of possible valid answers $x_i$. The validating device 202 may apply the same hash function applied by the access computing node 206 to compute a plurality of locally computed strings $H(H_1(x_i), H_2(x_i), \ldots, H_n(x_i))$. The validating device 202 may validate the multi-party consensus response x by comparing between the received hash value (limited length string) $H(H_1(x_m), H_2(x_m), \ldots, H_n(x_m))$ and each of the locally computed strings $H(H_1(x_i), H_2(x_i), \ldots, H_n(x_i))$ to check for a match.

Optionally, in particular in case the validating device 202 determines that the multi-party consensus answer is invalid, the validating device 202 publishes the plurality of hash values $H_1(x_i), H_2(x_i), \ldots, H_n(x_i)$ locally computed for each of the finite number of possible valid answers. Comparing between the $H_1(x_m), H_2(x_m), \ldots, H_n(x_m)$ received from the plurality of computing nodes 204 and the hash values $H_1(x_i), H_2(x_i), \ldots, H_n(x_i)$ published by the validating device 202, one or more of the computing nodes 204 may detect incompliance between one or more of the hash value computed by one or more malicious computing node 204 and respective hash values published by the validating device 202. The detecting computing node(s) 204 may further determine the identity of the malicious computing node(s) 204 according to a signature used to sign the incompliant hash value(s) $H_j(x_m)$ since the signature uniquely identifies the originating computing node(s) 204 j that transmitted the incompliant hash value(s) $H_j(x_m)$. The validating device 202 may therefore transmit a new set of symmetric hash functions $H'_1, H'_2, \ldots, H'_n$ to each of the plurality of computing nodes 204.

Moreover, in an extension to the first exemplary implementation, a plurality of deterministic signing functions may be used as the plurality of secret components instead of the symmetric hash functions, for example, a plurality of Rivest-Shamir-Adleman (RSA) functions and/or the like employing signing-verifying (private-public) key pairs for signing messages to authenticate the originating computing node 204 of each transmitted message. Each of (all of) the plurality of computing nodes 204 may apply a respective one of the plurality of deterministic signing functions to sign a respective one of the plurality of responses using the signing key of its respective signing-verifying key pair. One or more computing nodes 204 having the verifying key associated with at least some of the computing nodes 204 may check, prior to computing the limited length string (aggregated hash value), the responses received from one or more of the computing nodes 204. Based on the check, the checking computing node(s) 204 may identify one or more responses which are incompliant with the multi-party consensus answer and may thus determine that one or more of the at least some of the computing nodes 204 are potentially malicious nodes which responded with a response different than the multi-party consensus answer in attempt to manipulate the multi-party consensus answer. The checking computing node(s) 204 may further determine the identity of the malicious node(s) according to the verifying key corresponding to the signing key used to sign the incompliant response(s). This may allow early detection of the malicious node(s) prior to providing the limited length string to the validating device 202, i.e. before the user 208 interacts with the validating device 202.

As described herein before, one or more of the computing node(s) 204 suspected and/or determined to be malicious computing node(s) may be discarded from the community of computing nodes 204.

In a second exemplary implementation, the plurality of secret components are partial secret components created from a secret, optionally random, value generated for each of the finite number of possible valid answers using one or more secret sharing algorithms, for example, Shamir Secret sharing and/or the like. The validating device 202 may generate a plurality of random strings, specifically long random strings $R_1, R_2, \ldots, R_k$ each generated for a respective one of the finite number of possible valid answers $x_1, x_2, \ldots, x_k$. The validating device 202 may split each of the random strings $R_1, R_2, \ldots, R_k$ to a respective set S of n partial strings $R_iP_j$ using the secret sharing algorithm(s) applied according to one or more configuration parameters. Each set of partial strings therefore corresponds to a respective one of the finite number of possible valid answers. For example, the set $S_1[R_1, P_1, R_1, P_2, \ldots, R_1P_n]$ may be created for the random strings $R_1$ generated for the first possible valid answer $x_1$, the set $S_2[R_2P_1, R_2P_2, \ldots, R_2P_n]$ may be created for the random strings $R_2$ generated for the second possible valid answer $x_2$ and so on to the set $S_k[R_kP_1, R_kP_2, \ldots, R_kP_n]$ created for the random strings $R_k$ generated for the possible valid answer $x_k$.

The configuration parameter may define, for example, configuration of the secret sharing algorithm(s) to set a count of computing nodes 204 required for deciding on the multi-party consensus answer. For example, a certain configuration parameter may dictate that the multi-party consensus answer may be agreed between at least 4 out of 6 computing nodes 204 participating in the selection of the agreed possible valid answer to the query. In another example, multiple secret sharing algorithms may be concatenated to apply the secret sharing to groups of computing nodes 204, for example, three groups each comprising ten computing nodes 204. In such case a certain configuration parameter may dictate that the multi-party consensus answer may be agreed between at least 7 out of at least two of the three groups of computing nodes 204 participating in the selection of the agreed possible valid answer to the query.

The validating device 202 may locally compute a string for each of the plurality of random strings $R_1, R_2, \ldots, R_k$, for example, apply a certain hash function H to compute a hash value $H(R_i)$ for each of the random strings $R_i$. In case two or more of the computed hash value $H(R_i)$ are equal, the validating device 202 may generate new random strings $R'_i$ for each of the possible valid values.

The validating device 202 privately transmits the query coupled with one of the n partial strings $R_iP_j$ of each of the sets $S_1, S_2, \ldots, S_k$ to a respective computing node 204 j of n computing nodes 204 as dictated by the configuration parameter(s) defined for the secret sharing algorithm(s). Each of the n computing nodes 204 therefore receives a plurality of partial strings $R_iP_j$ each corresponding to one of the finite number of possible valid answers to the query. For example, a first computing node 204 may receive the partial strings $R_1P_1, R_2P_1, \ldots, R_kP_1$. In another example, the $n^{th}$ computing node 204 may receive the partial strings $R_1P_n, R_2P_n, \ldots, R_kP_n$.

Each of the computing nodes 204 may select its respective partial string $R_mP_j$ corresponding to the multi-party consensus answer $x_m$ decided by at least some of the plurality of computing nodes 204 for the query, in particular a majority of the computing nodes 204.

One or more of the computing nodes 204, for example, the access computing node 206 may receive the partial strings $R_iP_j$ corresponding to the multi-party consensus answer $x_m$ from a sufficient number of the plurality of computing nodes 204 as dictated by the configuration parameter(s). Given that the number of computing nodes 204 which transmitted their respective partial strings $R_iP_j$ is equal or larger than the sufficient number, the access computing node 206 may recover the random string $R_m$ corresponding to the multi-party consensus answer $x_m$. A major strength of the secret sharing algorithms is that the random string $R_m$ may be recovered from an aggregated response aggregating the partial strings $R_iP_j$ received from the sufficient number of computing nodes 204. However, the random string $R_m$ cannot be recovered from an aggregated response aggregating the partial strings $R_iP_j$ received from an insufficient number which is less than the sufficient number dictated by the configuration parameter(s). Moreover, the value (string) recovered from such aggregated response may be meaningless.

The access computing node 206 may apply the certain hash function H to compute the limited length string $H(R_m)$ for the recovered random string $R_m$ corresponding to the multi-party consensus answer x. The resulting hash value $H(R_m)$ serving as the limited length string may be provided to the validating device 202 through the limited capacity interface 216, for example, by the user 208 using the access computing node 206 to obtain the limited length string $H(R_m)$.

The validating device 202 may validate the multi-party consensus answer $x_m$ by comparing between the received hash value (limited length string) $H(R_m)$ and each of the locally computed strings $H(R_i)$ computed for the random strings $R_1, R_2, \ldots, R_k$ associated with the finite number of possible valid answers $x_1, x_2, \ldots, x_k$ to check for a match.

Optionally, the validating device 202 publishes a plurality of commitment values to support detection of one or more potential malicious computing nodes prior to providing the limited length string to the validating device 202, i.e. before the user 208 interacts with the validating device 202. The validating device 202 may use one or more commitment functions to compute a respective commitment value and a corresponding proof of commitment value for each of the partial strings $R_iP_j$ of each of the sets $S_1, S_2, \ldots, S_k$ corresponding to the k valid possible answers.

The validating device 202 may transmit a respective proof of commitment value coupled with the respective partial string $R_iP_j$ privately transmitted to the respective computing node 204 j of the n computing nodes 204. As such the commitment values are published by the validating device 202 to all n computing nodes 204 while each of the n computing nodes 204 privately holds its respective proof of commitment value.

After or in conjunction to responding with its respective partial string $R_mP_j$, each of the sufficient number of computing nodes 204 provides its respective proof of commitment value.

One or more computing nodes 204 may analyze, prior to computing the limited length string (the aggregated hash value), the commitment values published by the validating device 202 for the partial strings $R_iP_j$ using the respective proof of commitment value received from each of the computing nodes 204 with their respective partial strings $R_iP_j$. Based on the analysis the analyzing computing node 204 may check whether the response (i.e. the partial string $R_iP_j$) provided by each computing node 204 indeed reflects the possible valid answer to the query declared by the respective computing node 204, i.e. reflects the multi-party consensus answer decided by the plurality of computing nodes 204. In the response received from case one or more of the computing nodes is incompliant with the declared possible valid answer, the analyzing computing node 204 may determine that one or more of the computing nodes are malicious nodes. The analyzing computing node 204 may further identify the malicious node(s) 204 by tracing the incompliant response(s) to its originating computing node(s) 204.

As described herein before, one or more of the computing node(s) 204 suspected and/or determined to be malicious computing node(s) may be discarded from the community of computing nodes 204 and optionally replaced by another computing node(s) 204.

Optionally, the validating device 202 splits a single query to multiple sub-queries issued (optionally) simultaneously to the community of computing nodes 204. Each of the issued sub-queries may partially encode the finite number of possible valid answers such that aggregating the multi-party consensus answers computed in response to the plurality of sub-queries may yield a certain one of the possible valid answers. Specifically, the validating device 202 may apply one or more of the secret sharing algorithms, for example, the Shamir Secret sharing algorithm for generating the plurality of sub-queries. The term simultaneous should not be construed literally as simultaneously transmitting the plurality of queries (or part thereof) at the same time but rather that several queries may be issued before receiving answers to previous queries.

This may be done to reduce the number of strings generated for the possible valid answers, thus reducing the volume of data transmitted by the validating device 202 to the computing nodes 204. This may be of particular benefit in cases where there is a significantly large number of possible valid answers to a certain query. In such cases splitting the certain query to a plurality of sub-queries each partially a respective portion of the finite number of possible valid answers may significantly reduce the number of strings transmitted to the computing nodes 204 thus significantly reducing the volume of data transmitted over the unidirectional secure communication channel facilitated by the unidirectional transmitter 210.

Moreover, splitting the query to multiple sub-queries may significantly reduce the computing resources required by the validating device 202 to validate the response received from the computing nodes 204. Specifically, in case there is a significantly large number of possible valid answers, applying the split query methodology, the validating device 202 does not have to compute the hash values for the large number of possible valid answers but rather compute the hash value only for all possible valid answers of the plurality of sub-queries which may be very limited typically much smaller compared to the number of possible valid answers to the original (parent) query.

As opposed to generating the plurality of random strings $R_1, R_2, \ldots, R_k$ each for a respective one of the possible valid answers $x_1, x_2, \ldots, x_k$, the validating device 202 may create a plurality of random strings $R_{1_i}, R_{2_i}, \ldots, R_{l_i}$ each encoding all possible answers for a respective portion $o_i$ of a plurality of O portions mapping together the plurality of finite number of possible valid answers. Since there are O portions composing together the plurality of finite number of possible valid answers, the validating device 202 may issue O sub-queries each corresponding to a respective one of the portions.

As done for the single query, the validating device 202 may create each of the plurality of sub-queries by splitting each of the random strings $R_1, R_2, \ldots, R_{l_i}$ of each portion $o_i$ to a respective set S of n partial strings $R_i P_j$ using the secret sharing algorithm(s) applied according to one or more of the configuration parameters. Each set S of partial strings $R_{l_i} P_j$ therefore corresponds to a respective possible valid answer for a respective one of the plurality of portions composing together the finite number of possible valid answers. For example, the set $S_{1_i}[R_{1_i}P_1, R_{1_i}P_2, \ldots, R_{1_i}P_n]$ may be created for the random strings $R_1$ generated for the first possible valid answer of the portion $o_i$, the set $S_{2_i}[R_{2_i}P_1, R_{2_i}P_2, \ldots, R_{2_i}P_n]$ may be created for the random strings $R_2$ generated for the second possible valid answer of the portion $o_i$ and so on to the set $S_{k_i}[R_{k_i}P_1, R_{k_i}P_2, \ldots, R_{k_i}P_n]$ created for the random strings $R_k$ generated for the $k^{th}$ possible valid answer of the portion $o_i$.

The validating device 202 must share with the computing nodes 204 the mapping scheme implemented by the portions in order for the computing nodes 204 to refer to the same mapping scheme when responding with their answers. Optionally, the mapping scheme implemented by the portions is predefined and known to the validating device 202 as well as to the computing nodes 204.

The validating device 202 may locally compute a string for each combination of the random strings $R_1, R_2, \ldots, R_{l_i}$ encoding all possible answers for all of the O portions mapping together the plurality of finite number of possible valid answers. For example, the validating device 202 may apply a certain hash function H to compute a hash value for each of combination of the random strings generated for each of the portions.

The validating device 202 may then privately transmit the plurality of sub-queries to each computing node 204 $j$ of n computing nodes 204 of the community as dictated by the configuration parameter(s) defined for the secret sharing algorithm(s). Each of the sub-queries corresponds to a respective one of the portions where each of the sub-queries is coupled with one of the n partial strings $R_i P_j$ of the respective sets $S_{j_i}$ of the respective portion $o_i$. Each of the n computing nodes 204 therefore receives a plurality of sub-queries each coupled with partial strings $R_i P_j$ each corresponding to one of the finite number of possible valid answers to the respective portion. For example, for a query directed to a portion $o_i$, a first computing node 204 may receive the partial strings $R_{1_i} P_1, R_{2_i} P_1, \ldots, R_{l_i} P_1$. In another example, for the query directed to the portion $o_i$, the $n^{th}$ computing node 204 may receive the partial strings $R_{1_i} P_n, R_{2_i} P_n, \ldots, R_{l_i} P_n$.

For each of the sub-queries issued for a respective portion $o_i$, each of the computing nodes 204 may select its respective partial string $R_{m_i} P_j$ corresponding to the valid answer for portion $o_i$ mapping the multi-party consensus answer $x_m$ decided by at least some of the plurality of computing nodes 204 for the respective query, in particular a majority of the computing nodes 204.

As described for the single query scenario, the access computing node 206 may apply the certain hash function H to compute the limited length string H for the recovered random strings $R_{m_i}$ corresponding to the multi-party consensus answers for the plurality of portions O. The access computing node 206 may use one or more methods and/or techniques for computing the compute the limited length string, for example, apply the certain hash function H to a combination of the recovered random strings $R_{m_i}$ such as, for example, a concatenation, an encoded version of the recovered random strings $R_{m_i}$ and/or the like. The resulting hash value H serving as the limited length string may be provided to the validating device 202 through the limited capacity interface 216, for example, by the user 208 using the access computing node 206 to obtain the limited length string H.

The validating device 202 may validate the multi-party consensus answer by comparing between the received hash value (limited length string) H and each of the locally computed strings computed for the combinations of possible valid answers to the plurality of portions mapping the finite number of possible valid answers to check for a match.

The validating device 202 may apply one or more methods, techniques and/or implementations for selecting the portions which may cumulatively encode each of the finite number of possible valid answers, specifically a significantly large number of possible valid answers.

For example, validating device 202 may apply a segmented indexing mechanism for mapping the finite number of possible valid answers, specifically the significantly large number of possible valid answers. Assuming there are 1,000,000 possible valid answers, the validating device 202 may assign an incremental index (0 to 999,999) to each of the 1,000,000 possible valid answers and shares the indexing information with the plurality of computing nodes 204. Instead of generating a single query asking for a multi-party consensus answer indicating one of the 1,000,000 possible valid answers, the validating device 202 may issue a plurality of sub-queries each directed to a respective segment of the index of the 1,000,000 possible valid answers. For example, a first query may be directed to the hundreds of thousands digit of the index, a second query may be directed to the tens of thousands digit of the index, a third query may be directed to the thousands digit of the index, a fourth query may be directed to the hundreds digit of the index, a fifth query may be directed to the tens digit of the index and a sixth query may be directed to the units' digit of the index. Naturally, there may be 10 possible valid answers for each of the sub-queries (0 to 9).

The validating device 202 may generate a secret (random) value for each of the possible valid answers for each of the segment of the index, i.e. the possible valid values of the hundreds of thousands digit (i.e. 0-9), the possible valid values of the tens of thousands digit (i.e. 0-9), the possible valid values of the thousands digit (i.e. 0-9), the possible valid values of the hundreds digit (i.e. 0-9), the possible valid values of the tens digit (i.e. 0-9) and the possible valid values of the units digit (i.e. 0-9).

The validating device 202 may locally compute a string for each concatenation of a valid combination of the random strings $R_1, R_2, \ldots, R_{j_i}$ encoding a respective valid index of the plurality of indexes mapping all of the finite number of possible valid answers.

The validating device 202 may then privately transmit the plurality of sub-queries to the n computing nodes 204 as dictated by the configuration parameter(s) defined for the secret sharing algorithm(s). Each of the sub-queries corresponds to a respective digit of the index and each of the sub-queries is coupled with one of the n partial strings $R_i P_j$ of the respective sets $S_{j_i}$ of the respective index digit. For each of the sub-queries issued for a respective index digit, each of the computing nodes 204 may select its respective partial string corresponding to the valid answer for the respective index digit mapping the multi-party consensus answer decided by at least some of the plurality of computing nodes 204 for the respective query, in particular a majority of the computing nodes 204.

The access computing node 206 may apply the certain hash function H to compute the limited length string H for a combination and/or representation, for example, concatenation of the index digits mapping the multi-party consensus answer. The resulting hash value H serving as the limited length string may be provided to the validating device 202 which may validate the multi-party consensus answer by comparing between the received hash value H and each of the locally computed strings computed for the valid indexes mapping the finite number of possible valid answers to check for a match.

The following computation illustrates the reduction in the bandwidth required to transmit the significantly reduced volume of data by splitting the single query to the plurality of sub-queries each directed to a portion mapping the possible valid answers to the single certain query. As there are 1,000,000 possible valid answers to the certain query, according to the single query implementation, the validating device 202 may need to transmit 1,000,000 partial strings to each of the n computing nodes 204, i.e. $10^6$n partial strings. However, using the indexing implementation, the validating device 202 may need to transmit to each of the n computing nodes 204 only 10 partial strings (for each valid value of the index digit) for each of the 6 sub-queries directed to the six index digits thus resulting in 60n partial strings.

The query splitting scheme may be generalized to a plurality of splitting algorithms and/or practices. While in the exemplary implementation presented herein before the validating device 202 used a base 10 for splitting the query, assuming the number of possible valid answers to the query is K, the validating device may basically select any base b (2<b<k) for splitting the query.

The benefits and advantages of the query splitting scheme using different bases may be demonstrated as follows. Using the single query (un-split query) validation as described in various embodiments of the present invention, the validating device 202 needs to create k random strings $R_1, R_2, \ldots, R_k$ each for a respective one of the possible valid answers $x_1, x_2, \ldots, x_k$. Applying the query splitting on the other hand may require the validating device 202 to split the query to $\log_b$ k sub-queries and create only $b*\log_b$ k random strings for the possible valid answers of all the $\log_b$ k sub-queries recursively serving as indirect indexes for each other.

For example, assuming the validating device 202 applies a base 2 implementation, the validating device 202 may split the query to $\log_2$ k sub-queries and create $2*\log_2$ k random strings for the possible valid answers of the $\log_2$ k sub-queries. In another example, assuming the validating device 202 applies a base 4 implementation, the validating device 202 may split the query to $\log_4$ k sub-queries and create $4*\log_4$ k random strings for the possible valid answers of the $\log_4$ k sub-queries. Selecting the base 4 may be highly efficient since while the validating device 202 may be required to generate the same number of random strings ($4*\log_4$ k=$2*\log_2$ k), the number of sub-queries that the access computing node 206 needs to process may be significantly reduced. Practically the access computing node 206 may need to process only half of the sub-queries in the base 4 implementation ($\log_4$ k) compared to the sub-queries it may need to process in the base 2 implementation ($\log_2$ k) since $\log_4$ k=½*$\log_2$ k.

In a third exemplary implementation, the plurality of secret components are decryption key components created by splitting a decryption key C of an encryption-decryption (V/C) key pair using one or more threshold decryption algorithms, for example, a Paillier decryption algorithm and/or the like applied according one or more configuration parameters.

The validating device 202 may split the decryption key C to decryption key components $C_1, C_2, \ldots, C_n$ using the threshold decryption algorithm(s) applied according to the configuration parameters set and/or defined for the community of computing nodes 204. A major feature of the threshold decryption algorithm(s) is that only part of the decryption key components $C_1, C_2, \ldots, C_n$ created from the decryption key C is sufficient for decrypting an encrypt value encrypted using the corresponding encryption key V. The configuration parameter(s) may therefore define a sufficient number (threshold) of decryption key components $C_i$ that is required for decrypting the encrypt value encrypted using the corresponding encryption key V. For example, a certain configuration parameter may dictate that the sufficient number of decryption key components $C_i$ is 4 out of overall 6 decryption key components $C_1, C_2, \ldots, C_6$. In another example, multiple threshold decryption algorithms may be concatenated to apply the threshold decryption to groups of decryption key components. For example, three groups of decryption key components $C_i$ each comprising 10 decryption key components $C_1, C_2, \ldots, C_{10}$. In such case a certain configuration parameter may dictate that the sufficient number (threshold) of decryption key components $C_i$ required for decrypting the encrypt value is 7 decryption key components $C_i$ of at least two of the three groups.

The validating device 202 may distribute the plurality of decryption key components $C_1, C_2, \ldots, C_n$ to the plurality of n computing nodes 204 such that each of the computing nodes 204 has a respective one of the decryption key components $C_1, C_2, \ldots, C_n$. The validating device 202 may distribute decryption key components prior to transmitting any query, for example, during the initialization process.

When creating a query, the validating device 202 may generate a plurality of random strings, specifically long random strings $R_1, R_2, \ldots, R_k$ each generated for a respective one of the finite number of possible valid answers $x_1, x_2, \ldots, x_k$ to the query. The validating device 202 may produce a plurality of encrypt values $V(R_1), V(R_2), \ldots, V(R_k)$ each created by encrypting a respective one of the random strings $R_1, R_2, \ldots, R_k$ using the encryption key V.

The validating device 202 may locally compute a string for each of the plurality of random strings $R_1, R_2, \ldots, R_k$, for example, apply a certain hash function H to compute a hash value $H(R_i)$ for each of the random strings $R_i$. In case two or more of the computed hash value $H(R_i)$ are equal, the validating device 202 may generate new random strings $R'_i$ for each of the possible valid values.

The validating device 202 may then transmit the query which further includes the encrypt values $V(R_1), V(R_2), \ldots, V(R_k)$ produced for each of the random strings $R_1, R_2, \ldots, R_k$ generated for each of the possible valid answers $x_1, x_2, \ldots, x_k$.

After deciding on the multi-party consensus answer $x_m$ from the possible valid answers $x_1, x_2, \ldots, x_k$, at least some of the computing nodes 204 may engage in an MPC session and use their respective decryption key components $C_i$ to decrypt the encrypt value $V(R_m)$ and recover the random string $R_m$ corresponding to the multi-party consensus answer $x_m$. As described for the threshold decryption algorithms the sufficient number of decryption key components $C_i$ is required for decrypting the encrypt value $V(R_m)$. Since each computing node 204 has a respective one of the decryption key components $C_1, C_2, \ldots, C_n$ the sufficient number of decryption key components $C_i$ translates to a sufficient number of computing nodes 204 that are required to engage in the MPC in order to decrypt the encrypt value $V(R_m)$.

One or more of the computing nodes 204, for example, the access computing node 206 may apply the certain hash function H to compute the limited length string $H(R_m)$ for the random string $R_m$ decrypted in the MPC. The resulting hash value $H(R_m)$ serving as the limited length string may be provided to the validating device 202 through the limited capacity interface 216, for example, by the user 208 using the access computing node 206 to obtain the limited length string $H(R_m)$.

The validating device 202 may validate the multi-party consensus answer $x_m$ by comparing between the received hash value (limited length string) $H(R_m)$ and each of the locally computed strings $H(R_i)$ computed for the random strings $R_1, R_2, \ldots, R_k$ associated with the finite number of possible valid answers $x_1, x_2, \ldots, x_k$ to check for a match.

Optionally, in particular in case the validating device 202 determines that the multi-party consensus answer is invalid, the validating device 202 publishes encryption key V and the plurality of decryption key components $C_1, C_2, \ldots, C_n$. Using the encryption key V and the plurality of decryption key components $C_1, C_2, \ldots, C_n$ one or more of the computing nodes 204 may identify one or more malicious computing nodes of the sufficient number of computing nodes 204 that engaged in the MPC in case the at least one malicious computing node engaged in MPC in an improper manner in attempt to manipulate the MPC. The identifying computing node(s) 204 may further identify the malicious computing node(s) 204 according to its respective decryption key components $C_i$.

As described herein before, one or more of the computing node(s) 204 suspected and/or determined to be malicious computing node(s) may be discarded from the community of computing nodes 204 and optionally replaced by another computing node(s) 204.

In a fourth exemplary implementation the plurality of secret components are signing key components created by splitting a signing key C of an signing-verifying (V/C) key pair using one or more threshold signature algorithms applied according one or more configuration parameters. In particular, threshold signature algorithms that are characterized by producing deterministic output values such that for a given input the output will always be the same.

The validating device 202 may split the signing key C to signing key components $C_1, C_2, \ldots, C_n$ using the threshold signature algorithm(s) applied according to the configuration parameters set and/or defined for the community of computing nodes 204. Similarly to the threshold decryption algorithms, the threshold signature algorithms are characterized by the feature that only part of the signing key components $C_1, C_2, \ldots, C_n$ created from the signing key C is sufficient for deterministically creating a signature equal to the signature created using the complete signing key C. As described for the threshold decryption algorithms, the configuration parameter(s) may therefore define a sufficient number (threshold) of singing key components $C_i$ required for creating a signature that is equal to the signature created using the signing key C.

The validating device 202 may distribute the plurality of singing key components $C_1, C_2, \ldots, C_n$ to the plurality of n computing nodes 204 such that each of the computing nodes 204 has a respective one of the singing key components $C_1, C_2, \ldots, C_n$. The validating device 202 may distribute the singing key components $C_i$ prior to transmitting any query, for example, during the initialization process.

When creating a query, the validating device 202 may generate a plurality of strings $R_1, R_2, \ldots, R_k$ each generated for a respective one of the finite number of possible valid answers $x_1, x_2, \ldots, x_k$ to the query. The validating device 202 may produce a plurality of deterministic signatures, for example, $Signature_c(R_1), Signature_c(R_2), \ldots, Signature_c(R_k)$ each created by applying the threshold signature algorithm(s) to a respective one of the strings $R_1, R_2, \ldots, R_k$ using the signing key C.

The validating device 202 may locally compute a string for each of the plurality of deterministic signatures $Signature_c(R_1)$, for example, apply a certain hash function H to compute a hash value $H(Signature_c(R_i))$. In case two or more of the computed hash value $H(Signature_c(R_i))$ are equal, the validating device 202 may generate new strings $R'_i$ for each of the finite number of possible valid answers.

The validating device 202 may then transmit the query to the plurality of computing nodes 204, where the query further includes the strings $R_1, R_2, \ldots, R_k$ generated for each of the possible valid answers $x_1, x_2, \ldots, x_k$.

After deciding on the multi-party consensus answer $x_m$ from the possible valid answers $x_1, x_2, \ldots, x_k$, at least some of the computing nodes 204 may engage in an MPC session and use their respective signing key components $C_i$ to sign the string $R_m$ corresponding to the multi-party consensus answer $x_m$ and produce a deterministic signature $\text{Signature}_c(R_m)$. As described for the threshold decryption algorithm the sufficient number of signing key components $C_i$ is required for decrypting the encrypt value $V(R_m)$. Since each computing node 204 has a respective one of the signing key components $C_1, C_2, \ldots, C_n$ the sufficient number of signing key components $C_i$ translates to a sufficient number of computing nodes 204 that are required to engage in the MPC in order to properly sign the string $R_m$ to produce the deterministic signature $\text{Signature}_c(R_m)$.

One or more of the threshold signature algorithms may inherently support detection of improper engagement of the computing nodes 204 in the MPC and may further support identification of one or more malicious computing nodes which improperly engage in the MPC in attempt to manipulate the MPC. One or more of the computing nodes 204 may therefore identify one or more malicious computing nodes among the sufficient number of computing nodes 204 which engage in the MPC in an improper manner.

One or more of the computing nodes 204, for example, the access computing node 206 may apply the certain hash function H to compute the limited length string $H(\text{Signature}_c(R_m))$ for the deterministic signature $\text{Signature}_c(R_m)$ computed during the MPC for the string $R_m$ corresponding to the multi-party consensus answer $x_m$. The resulting hash value $H(\text{Signature}_c(R_m))$ serving as the limited length string may be provided to the validating device 202 through the limited capacity interface 216, for example, by the user 208 using the access computing node 206 to obtain the limited length string $H(R_m)$.

The validating device 202 may validate the multi-party consensus response m by comparing between the received hash value (limited length string) $H(\text{Signature}_c(R_m))$ and each of the locally computed strings $H(\text{Signature}_c(R_i))$ computed for the strings $R_1, R_2, \ldots, R_k$ associated with the finite number of possible valid answers $x_1, x_2, \ldots, x_k$ to check for a match.

As described herein before, one or more of the computing node(s) 204 suspected and/or determined to be malicious computing node(s) may be discarded from the community of computing nodes 204 and optionally replaced by another computing node(s) 204.

It is expected that during the life of a patent maturing from this application many relevant systems, methods and computer programs will be developed and the scope of the terms secure channel, secret sharing algorithm, threshold encryption algorithm, threshold signature algorithm are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of validating a multi-party consensus over a limited connection, comprising:
   using at least one processor of a validating device for:
   transmitting a query to a plurality of computing nodes via a unidirectional secure communication channel, the query having a finite number of possible valid answers, wherein said validating device comprises only a single communication channel for outputting transmissions, said single communication channel is said unidirectional secure communication channel and wherein said validating device comprises only a single input interface capable of receiving only limited length strings, such that said plurality of computing nodes have no access to transmit data to said validating device;
   receiving a limited length string computed based on an aggregated response aggregating a plurality of responses each computed for a multi-party consensus answer to the query by each of at least some of the plurality of computing nodes using a respective one of a plurality of secret components;
   computing locally on said validating device, a plurality of locally computed strings, each computed based on a respective one of the finite number of possible valid answers using an aggregated secret aggregating the plurality of secret components;
   validating the multi-party consensus answer by comparing the received limited length string to each of the plurality of locally computed strings; and
   initiating at least one operation according to an outcome of the validation.

2. The method of claim 1, wherein the validating device applies the validation of the multi-party consensus answer for checking blockchain transactions information relating to the validating device; wherein the validating device is a crypto-currency wallet and the validation of the multi-party consensus response is applied for checking a balance of the crypto-currency wallet;
   wherein the at least one operation comprising transmitting at least one cryptocurrency transaction based on the multi-party consensus answer after validated.

3. The method of claim 1, wherein the unidirectional secure communication channel is physically tamper resistant thus supporting reliable and secure one-way communication from the validating device to each of the plurality of computing nodes.

4. The method of claim 1, wherein the validating device communicates with the plurality of computing nodes via at least one access node of the plurality of computing nodes which broadcasts messages received from the validating device to the plurality of computing nodes.

5. The method of claim 1, wherein the secure unidirectional communication channel established with at least one of the plurality of computing nodes is secured by encrypting communication transmitted from the validating device to the at least one computing node using an encryption key of a respective encryption-decryption key pair uniquely associated with the at least one computing node, the respective encryption key is provided to the validating device as a respective limited length string.

6. The method of claim 1, further comprising the secure unidirectional communication channel established with at least one of the plurality of computing nodes is secured by encrypting communication transmitted from the validating device to the at least one computing node using an encryption key of an encryption-decryption key pair uniquely associated with the at least one computing node, the encryption key is provided to the validating device by at least one trusted controller adapted to distribute to the at least one computing node a decryption key of the encryption-decryption key pair uniquely associated with the at least one computing node, the encryption-decryption key pair is produced deterministically using a pseudorandom number generator initialized with a random seed shared in advance with the validating device, using the shared random seed the validating device generates the encryption key of the encryption-decryption key pair and uses it to establish the encrypt communication transmitted to the at least one computing node.

7. The method of claim 6, wherein the at least one trusted controller is at least one of:
   further adapted to periodically distribute a new encryption-decryption key pair to the at least one computing node every predefined period of time, the new encryption-decryption key is produced deterministically using the pseudorandom number generator initialized with the random seed shared with the validating device and a time identifier assigned to the new encryption-decryption key, and
   further adapted to distribute a respective encryption-decryption key pair to each of multiple computing nodes, the respective encryption-decryption key pair is produced deterministically using the pseudorandom number generator initialized with the random seed shared with the validating device and an index of the respective computing node.

8. The method of claim 6, wherein the at least one trusted controller communicates with the at least one computing node via a unidirectional secure communication channel similar to the unidirectional secure communication channel of the validating device.

9. The method of claim 1, further comprising transmitting a plurality of queries simultaneously to the plurality of computing nodes such that a later query is transmitted before receiving response to an earlier transmitted query.

10. The method of claim 1, further comprising transmitting the query coupled with a unique identifier which is used by the at least some computing nodes to compute the plurality of responses is used by the validating device to verify that the limited length string corresponds to the query.

11. The method of claim 1, further comprising at least one of the plurality of computing nodes communicates with at least another one of the plurality of computing nodes to support computation of a respective one of the plurality of responses.

12. The method of claim 1, wherein the plurality of secret components are transmitted by the validating device to the plurality of computing nodes; further comprising the validating device transmits the plurality of secret components to the plurality of computing nodes once during an initialization sequence and/or to each of the computing nodes with the query and signs the plurality of secret components transmitted to the plurality of computing nodes using a signing key.

13. The method of claim 1, further comprising applying a two-stage query for a complex query having an extremely large number of possible valid answers as follows:
   in a first stage of the two-stage query, the validating device transmits the complex query to the plurality of computing nodes and receives in response a first limited length string computed based on a first multi-party answer computed by at least one of the at least some computing nodes for the multi-party consensus answer to the complex query using the respective secret component, wherein the validating device uses the aggregated secret to extract the first multi-party answer, and in a second stage of the two-stage query, the validating device transmits a second query requesting the at least some computing nodes to confirm the first multi-party answer received for the complex query, the second query having two possible valid answers, namely correct and incorrect.

14. The method of claim 1, wherein the plurality of secret components is a plurality of symmetric hash functions, each of the plurality of computing nodes uses a respective one of the plurality of symmetric hash functions to compute a respective one of a plurality of hash values based on the multi-party consensus answer to the query, the limited length string is an aggregated hash value computed by aggregating the plurality of hash values computed by the plurality of computing nodes, the validation is done by comparing the limited length string to each of a set of locally generated limited length strings each generated for a respective one of the finite number of possible valid answers using aggregation of the plurality of symmetric hash functions.

15. The method of claim 14, further comprising publishing a plurality of hash values locally computed by the validating device for each of the finite number of possible valid answers in case, based on analysis of the received limited length string, the validating device determines that the multi-party consensus answer is invalid, each of the plurality of locally computed hash values is computed using a respective one of the plurality of symmetric hash functions, at least one of the plurality of computing nodes identifies at least one malicious computing node of the plurality of computing nodes by detecting incompliance between at least one hash value computed by at least one malicious computing node and a respective one of the plurality of locally computed hash values.

16. The method of claim 14, further comprising using a plurality of deterministic signing functions instead of the plurality of symmetric hash functions, each of the plurality of deterministic signing functions has a respective one of a plurality of signing-verifying key pairs, each of the plurality of computing nodes applies a respective one of the plurality of deterministic signing functions to sign a respective one of the plurality of responses using a signing key of the respective signing-verifying key pair.

17. The method of claim 1, wherein the plurality of secret components are a plurality of partial secret components created from a secret value generated for each of the finite number of possible valid answers using at least one secret sharing algorithm, the validating device generates a respective one of a plurality of random strings each generated for the respective possible valid answer and splits each of the plurality of random strings to a respective set of partial strings using the at least one secret sharing algorithm applied according to at least one configuration parameter, the query transmitted to each of the plurality of computing nodes comprises a respective partial string of each set of partial values, each of the at least some computing nodes transmits its respective partial string corresponding to the multi-party consensus answer, the limited length string is a hash value computed based on the aggregated response aggregating the partial strings received from a sufficient number of the plurality of computing nodes, the sufficient number is defined by the at least one configuration parameter, the validation is done by comparing the limited length string to each of a set of locally generated limited length strings each generated for a respective one of the finite number of possible valid answers using the secret value.

18. The method of claim 1, wherein the plurality of secret components are a plurality of decryption key components created by splitting a decryption key of an encryption-decryption key pair using at least one threshold decryption algorithm applied according to at least one configuration parameter, the query transmitted to the plurality of computing nodes comprises the query and a plurality of encrypt values encrypting a plurality of random strings each generated by the validation device for a respective one of the finite number of possible valid answers, the plurality of encrypt values are produced by encrypting the plurality of random strings using an encryption key of the encryption-decryption key pair, a sufficient number of the plurality of computing nodes engage in a Multi-Party Computation (MPC) and use their respective decryption key components to decrypt an encrypt value of the plurality of encrypt values corresponding to a certain one of the finite number of possible valid answers as expressed in the multi-party consensus answer, the limited length string is a hash value computed for the decrypted encrypt value, the sufficient number is defined by the at least one configuration parameter, the validation is done by comparing the limited length string to each of a set of locally generated limited length strings each generated for a respective one of the random strings generated for the finite number of possible valid answers.

19. The method of claim 1, wherein the plurality of secret components are a plurality of signing key components created from a signing key of a signing-verifying key pair split using at least one threshold signature algorithm applied according to at least one configuration parameter, the at least one threshold signature algorithm is characterized by producing a deterministic output for a given input, the query transmitted to the plurality of computing nodes comprises the query and a plurality of strings each corresponding to a respective one of the finite number of possible valid answers, a sufficient number of computing nodes of the plurality of computing nodes engage in a Multi-Party Computation (MPC) and use their respective signing key components to produce a deterministic signature for one of the plurality of strings corresponding to an agreed one of the finite number of possible valid answers as expressed in the multi-party consensus answer, the limited length string is a hash value computed for the deterministic signature, the sufficient number is defined by the at least one configuration parameter, the validation is done by comparing the limited length string to each of a set of locally computed limited length strings each computed for respective deterministic signature generated for a respective one of the plurality of strings using the signing key.

20. An apparatus for validating a multi-party consensus over a limited connection, comprising:
 a first interface, adapted to transmit messages to a plurality of computing nodes over a unidirectional secure communication channel;
 a second interface adapted to receive limited length strings; and
 at least one processor coupled to the first and second interfaces, the at least one processor is adapted to execute a code, the code comprising:
  code instructions to transmit a query to the plurality of computing nodes, the query having a finite number of possible valid answers,
  code instructions to receive a limited length string computed based on an aggregated response aggregating a plurality of responses each computed for a multi-party consensus answer to the query by each of at least some of the plurality of computing nodes using a respective one of a plurality of secret components, code instructions to compute locally on said apparatus, a plurality of locally computed strings each computed based on a respective one of the finite number of possible valid answers using an aggregated secret aggregating the plurality of secret components, code instructions to validate the multi-party consensus answer by comparing the received limited length string to each of the plurality of locally computed strings, and code instructions to initiate at least one operation according to an outcome of the validation;

wherein said apparatus comprises only a single output interface for outputting transmissions, which is said first interface and wherein said apparatus comprises only a single input interface which is said second interface, such that said plurality of computing nodes have no access to transmit data to said apparatus.

* * * * *